Nov. 29, 1955 W. W. PHARIS 2,725,429

SIGNALING SYSTEM

Filed April 12, 1952 14 Sheets-Sheet 1

INVENTOR
W. W. PHARIS
BY T. L. Bowes
ATTORNEY

INVENTOR
W. W. PHARIS
BY
T. L. Bowes
ATTORNEY

INVENTOR
W. W. PHARIS
BY
T. L. Bowes
ATTORNEY

INVENTOR
W. W. PHARIS
BY
T. L. Bowes
ATTORNEY

Nov. 29, 1955 W. W. PHARIS 2,725,429

SIGNALING SYSTEM

Filed April 12, 1952 14 Sheets-Sheet 5

INVENTOR
W. W. PHARIS
BY
T. L. Bowes
ATTORNEY

INVENTOR
W. W. PHARIS
BY
T. L. Bowes
ATTORNEY

Nov. 29, 1955 W. W. PHARIS 2,725,429

SIGNALING SYSTEM

Filed April 12, 1952 14 Sheets-Sheet 7

INVENTOR
W. W. PHARIS
BY T. L. Bowes
ATTORNEY

SIGNALING SYSTEM

Filed April 12, 1952 14 Sheets-Sheet 8

INVENTOR
W. W. PHARIS
BY
T. L. Bowes
ATTORNEY

SIGNALING SYSTEM

INVENTOR
W. W. PHARIS
BY
T. L. Bowes
ATTORNEY

SIGNALING SYSTEM

Filed April 12, 1952

INVENTOR
W. W. PHARIS
BY T. L. Bowes
ATTORNEY

INVENTOR
W. W. PHARIS
BY T. L. Bowes
ATTORNEY

Nov. 29, 1955 W. W. PHARIS 2,725,429

SIGNALING SYSTEM

Filed April 12, 1952 14 Sheets-Sheet 12

INVENTOR
W. W. PHARIS

BY T. L. Bowes

ATTORNEY

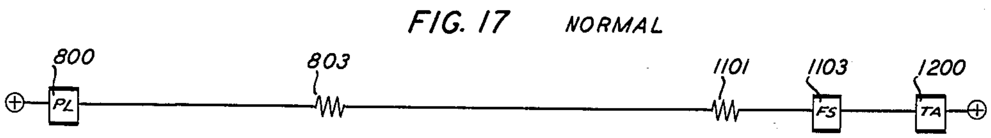
FIG. 17 NORMAL
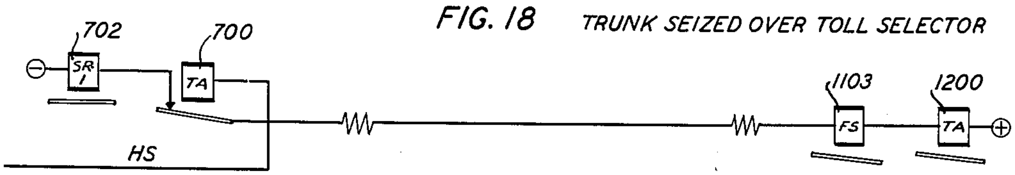
FIG. 18 TRUNK SEIZED OVER TOLL SELECTOR
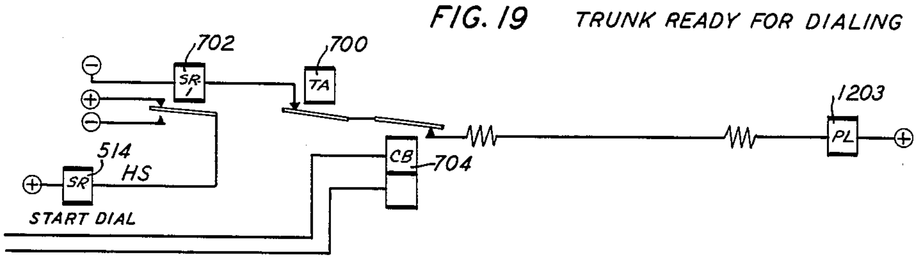
FIG. 19 TRUNK READY FOR DIALING
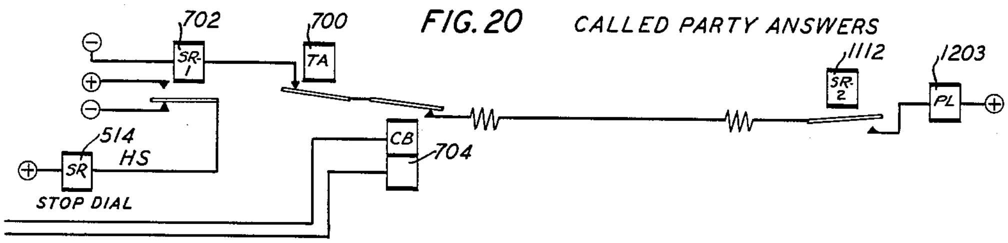
FIG. 20 CALLED PARTY ANSWERS
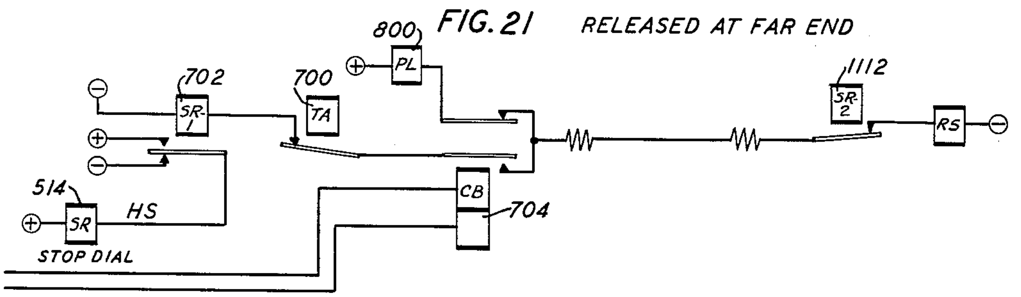
FIG. 21 RELEASED AT FAR END
INVENTOR
W. W. PHARIS
BY T. L. Bowes
ATTORNEY FIG. 22 INCOMING SELECTOR OPENS LONG LINE AND RELEASES NEAR END
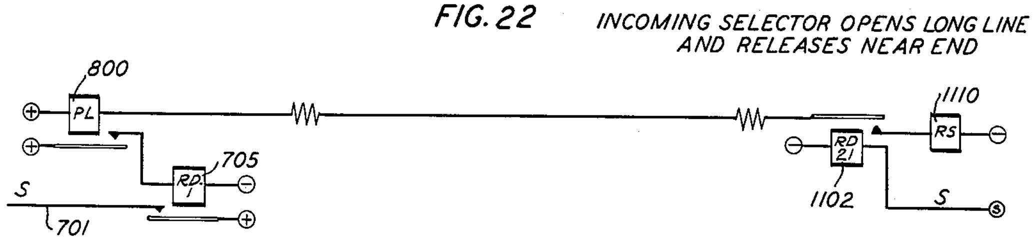
FIG. 23 TRUNK SEIZED OVER LOCAL SEL.
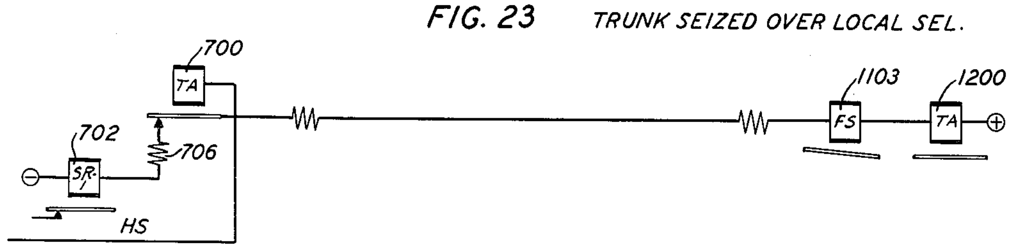
FIG. 24 TRUNK READY FOR DIALING
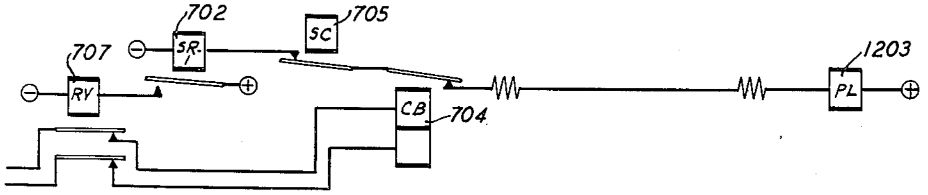
FIG. 25 CALLED PARTY ANSWERS
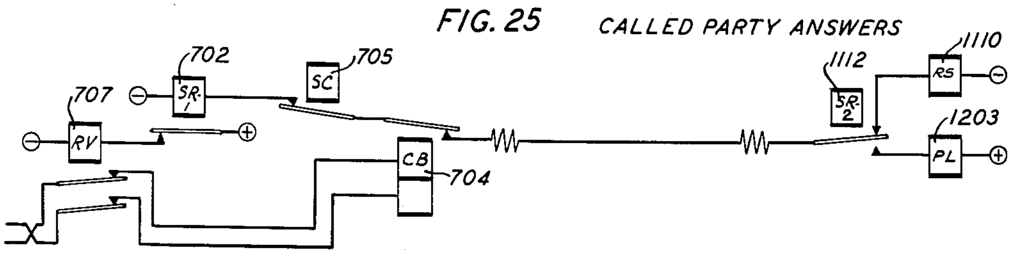
INVENTOR
W. W. PHARIS
BY T. L. Bowes
ATTORNEY 2,725,429

SIGNALING SYSTEM

William W. Pharis, Rochester, N. Y., assignor, by mesne assignments, to General Dynamics Corporation, a corporation of Delaware Application April 12, 1952, Serial No. 282,021

9 Claims. (Cl. 179—27)

This invention relates to signaling systems and particularly to small current signaling employed in telecommunication systems.

The object of the invention is to provide discriminating means in a two way trunk circuit for extending different types of connections over long lines so as to render such long lines universally useful and otherwise to promote speed and accuracy of operation and economy in the switching arrangements involved in the establishment of telecommunication channels between distant communities.

The invention consists of a number of improvements in a two way trunk line extending between distant communities, which trunk line may be employed for the dial controlled establishment of a connection to a distant substation either from a toll operator's position or from a subscriber's station.

The trunk line is a circuit arrangement which may be seized at either end and then employed for setting switches such as incoming selectors and connectors at the distant end by the transmission of dial pulses over the simplexed or composited long line arrangement between the two ends of such trunk line. Each terminal circuit of the trunk line then has, first, a set of terminals in the banks of certain selectors whereby such circuit may be seized either from substation circuits or toll operators' positions, second, connections to an incoming selector whereby connections may be extended to different local points and, third, connections either to simplex or composite circuit arrangements leading over a long line to its distant companion terminal circuit. Improvements in this circuit arrangement which lead to greater speed in operation and which minimize the holding time in other respects than the actual conversational period are of great value in these relatively costly circuits.

A feature of the invention is the use of discriminating means whereby the trunk circuit may adjust itself to the type of circuit employed in its seizure. Specifically the trunk circuit must respond differently to a connection extended from a toll operator's position and a connection extended from a subscriber's station. In the first instance there is a toll relay (TA) which operates from a local connection and establishes a comparatively low resistance path over the simplex or composite leg of the circuit to the distant end and there a local relay responds to the establishment of such connection and prepares the long line circuit for dialing. When the toll relay at one end operates, the corresponding toll relay at the other end operates and these two toll relays adjust the trunk line for toll operation at both ends.

Under all conditions the long line circuit is normally connected to ground at each end and when seized at one end substitutes a battery connection thereat to cause an operation at the other end. Thus, when the near end is seized either by a toll selector or by a local selector, the ground connection at the near end is changed to a battery connection with the result that the far end is immediately prepared for dialing. In addition, the character of the said battery connection is varied in accordance with the type of selector which has made the seizure so that the far end in addition to being prepared for dialing is simultaneously prepared for operation in accordance with the principles of toll operation or local operation.

A feature of the invention is a marginal operation circuit including a long line as a link thereof. In this two way trunk circuit it is required that incidental information be transmitted over the long line between the two terminal circuits as well as the conventional operation signals such as the seizure, release and dial signals. Since the trunk is adapted for what might be termed universal service, it is required that when it is seized at one end by different types of circuits its distant end must be adapted to cooperate therewith. If, by way of example, it is seized by a toll selector, then its distant end must be arranged so that the signals required by a toll board circuit may be properly transmitted whereas if it is seized by a local selector operated from a local subscriber's station, then its distant end must be arranged to transmit back signals required by this kind of circuit. Consequently an outgoing toll call is differentiated from an outgoing local call and the seizure of the distant end of the trunk and the incoming switch thereat is accomplished in a different characteristic manner involving a marginal circuit including the long line between the two ends of the trunk line.

Each terminal circuit of the trunk line contains a toll relay. That at the near end (the end where the trunk is seized) is operated if the trunk is seized by a toll selector but is not operated if the trunk is seized by a local selector. In the first case a low resistance path is connected to the long line which will result in the operation of the distant toll relay but in the second case a high resistance path is connected to the long line thus preventing the operation of the distant toll relay. Both circuits operate a relay at the distant end to prepare the circuit for dialing and as soon as these preparations are completed the lowering of the resistance of the long line results in the preparation of the near end. Thus a marginal operation over the long line is used first in one direction to adapt the circuit at the distant end for cooperation with the particular type of circuit connected to the near end and thereafter a marginal operation over the long line in the other direction is used to complete at the near end the arrangements for dialing.

A feature of the invention may then be stated as a double differential circuit involving a long line circuit between the two terminal circuits of a trunk line. Firstly, as above stated, a low or a high resistance circuit is established to operate or fail to operate a given relay at the distant end, both these circuits however being of a resistance sufficiently high to prevent the operation of a relay at the near end. Thereafter, when the differentiation at the distant end has been successfully completed, the resistance of the long line circuit is still further reduced to constitute an answer back signal which operates a relay at the near end. The circuit is thus arranged to transmit three values of current, the difference between the high and medium values being used to signal the far end the character of the connected circuit at the near end and the final low value being used as an answer back to signal the near end that the far end is ready to receive dial pulses.

Another feature of the invention is a means for guarding the near end of the trunk against seizure after a disconnect signal has been transmitted to the far end and to maintain this guard until the incoming selector thereat has restored to normal. In accordance with this feature, when the calling bridge relay at the near end is released, an operation which would ordinarily release the first slow relay and thereby remove the guarding ground from the sleeve in turn to release the switch train built up to this connection, the near end pulsing relay is substituted in the long line circuit thus reversing the current flow and operating the release relay at the far end. The near end pulsing relay operates and substitutes a sleeve holding ground and this is maintained until the incoming selector at the far end is restored to normal, whereupon the long line circuit is opened at the far end and the pulsing relay at the near end is released.

Thus the long line including the simplex or the composite leg is employed not only for seizing a far end circuit, for pulsing and for releasing but for transmitting other information by marginal and by polar operation.

Other features will appear hereinafter.

The drawings consist of fourteen sheets, having twenty-five figures, as follows.

Figure 1:
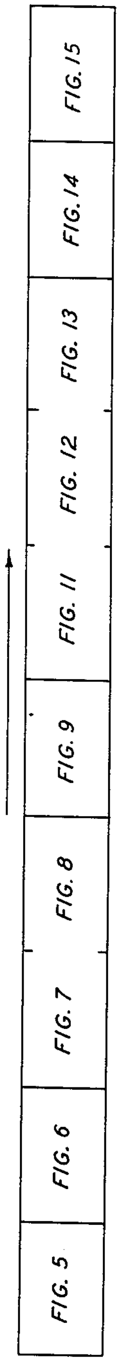
Fig. 1 is a block diagram showing how Figs. 5–15 inclusive may be placed to form a schematic circuit diagram for a connection built up from a toll board in Fig. 5 to a called subscriber station in Fig. 15.
Figure 2:
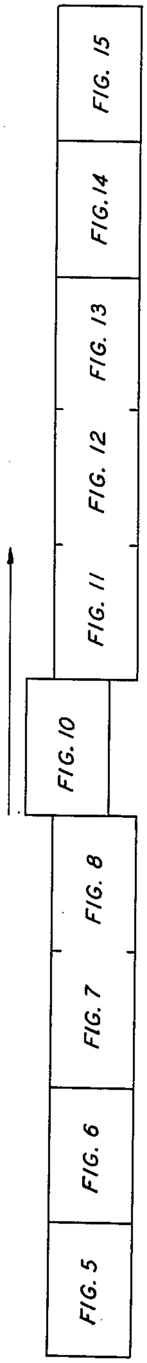
Fig. 2 is a similar block diagram in which Fig. 10 has been substituted for Fig. 9, thus changing transmission over the long line from a simplexed to a composited circuit.
Figure 3:
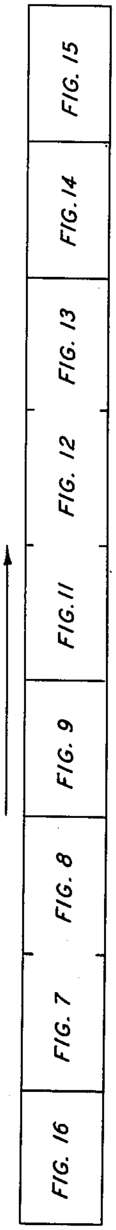
Fig. 3 is a similar block diagram in which a local subscriber station and a switch train shown in Fig. 16 is substituted for the toll operator's position and toll switch train of Figs. 5 and 6.
Figure 4:
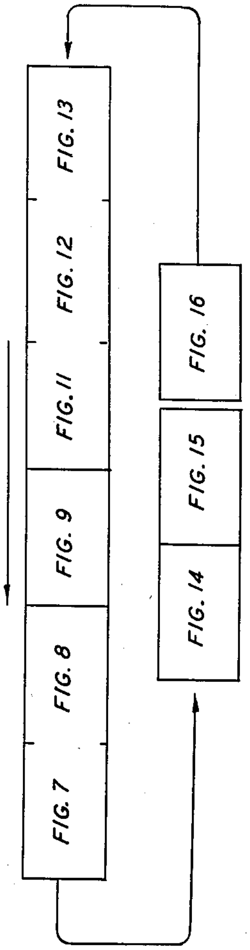
Figure 5A:
Figure 5:
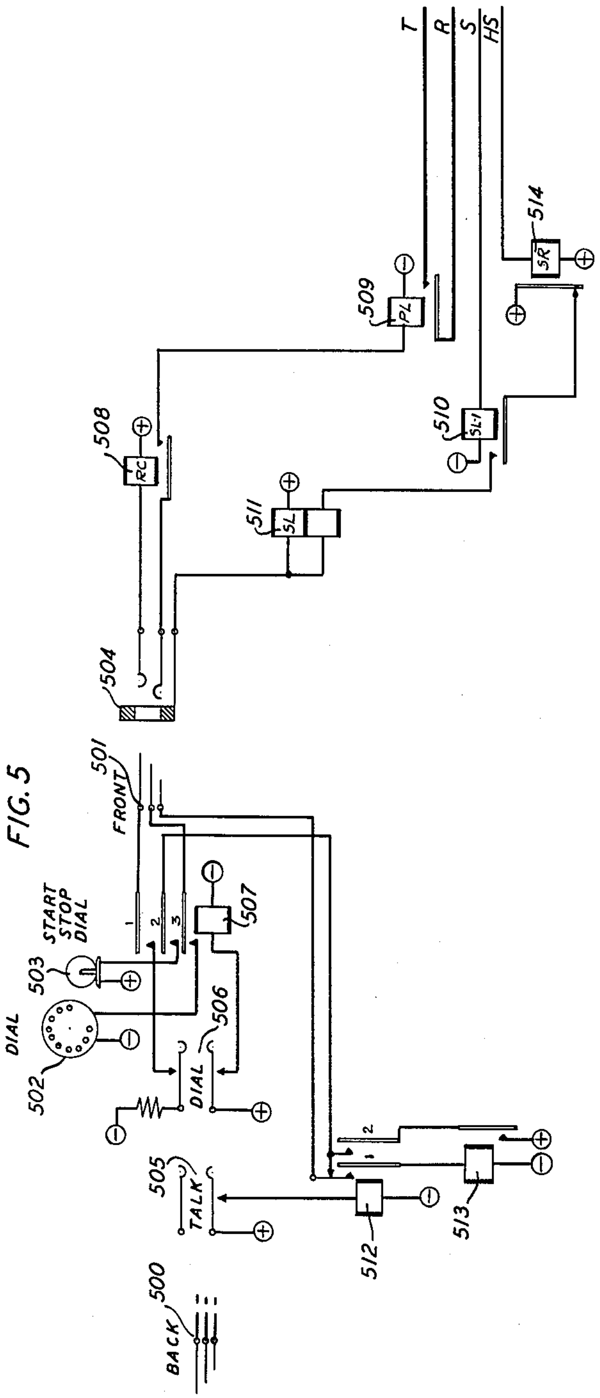
Figures 6, 6A:
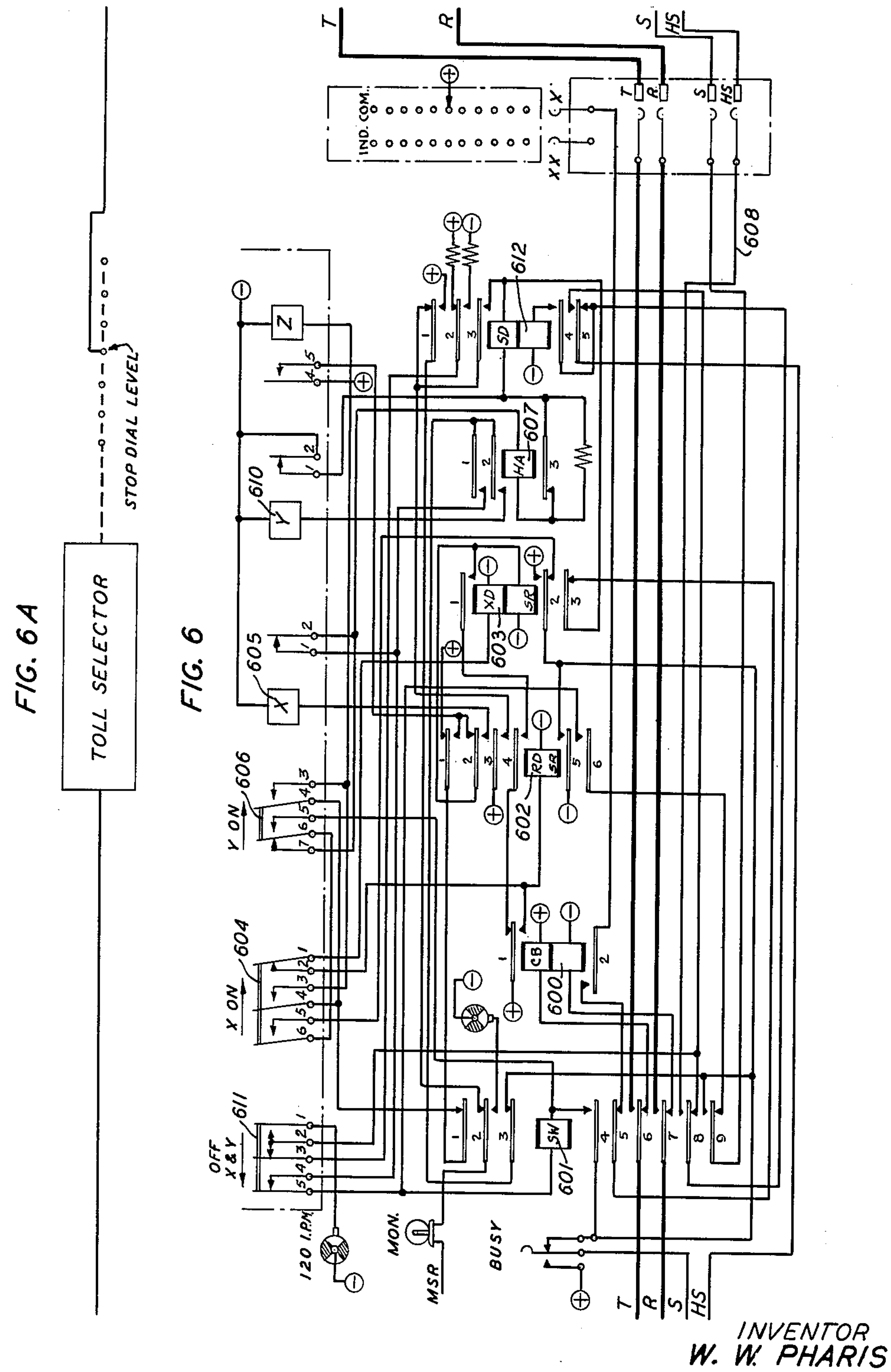
Figures 7, 7A:
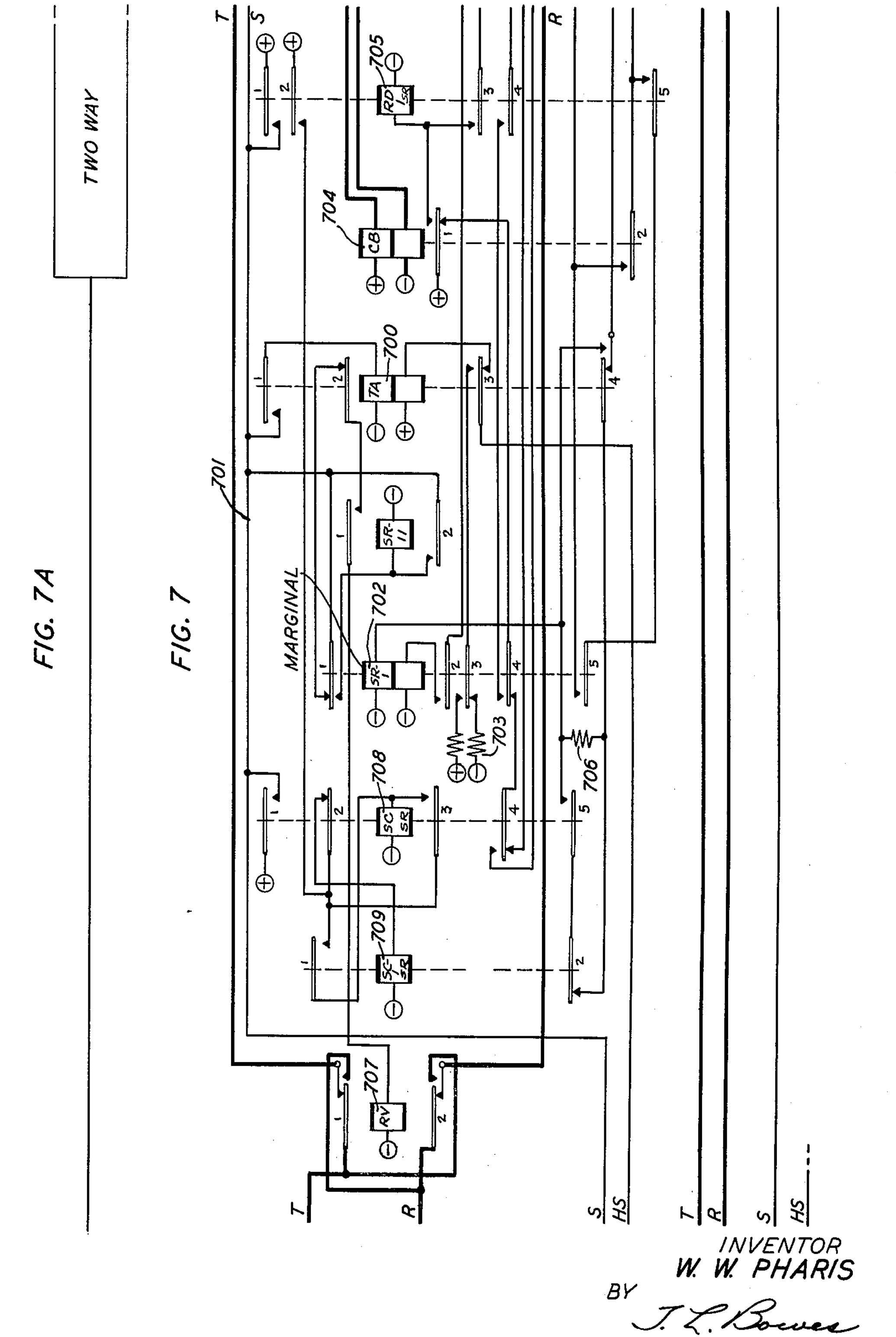
Figures 8, 8A:
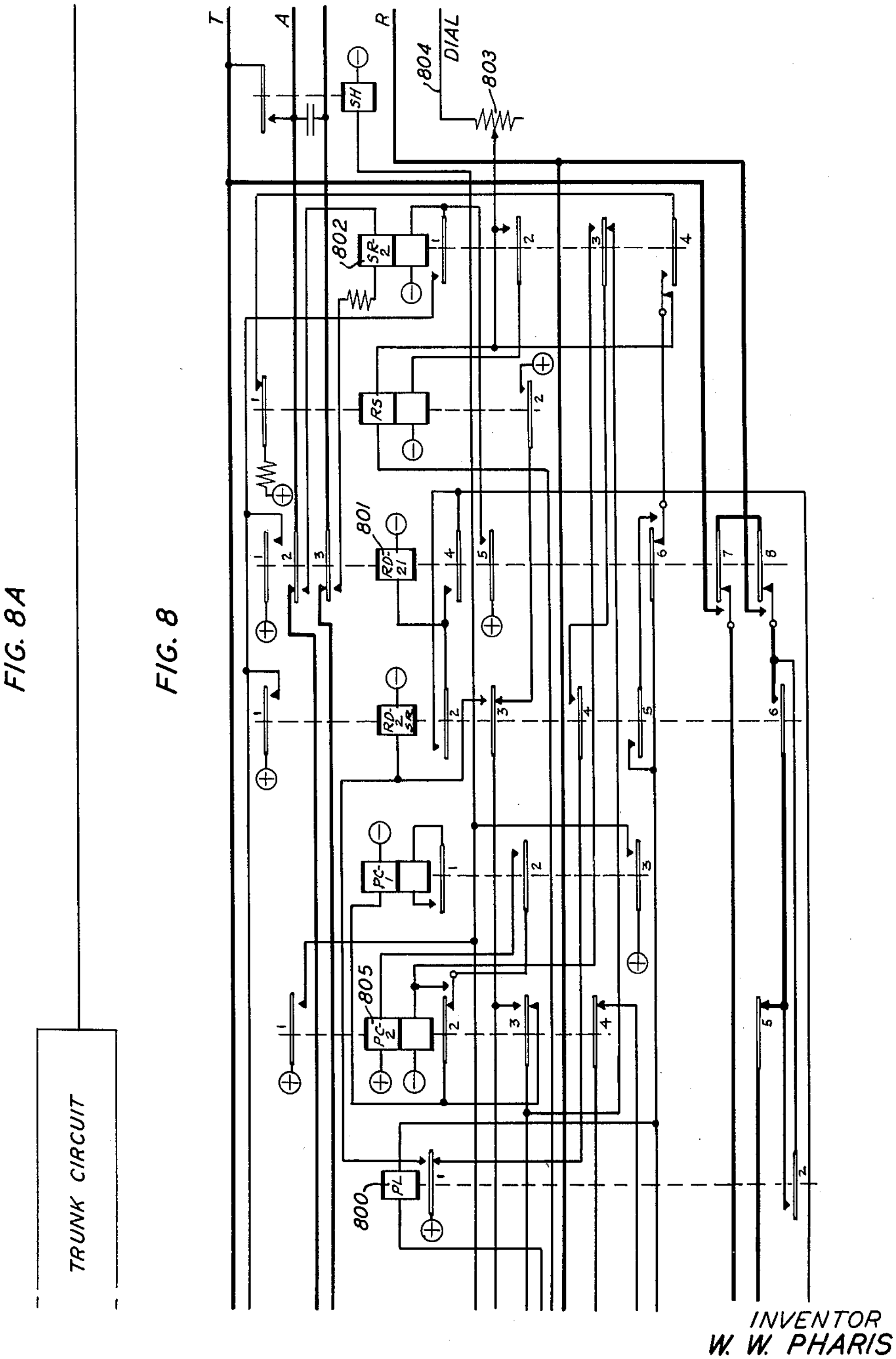
Figure 9A:
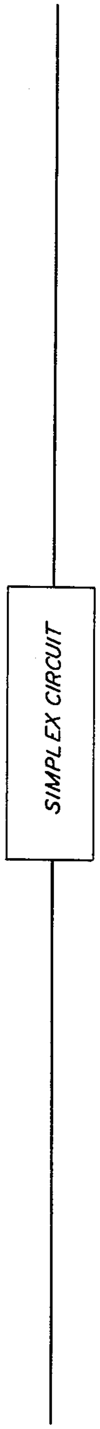
Figure 9:
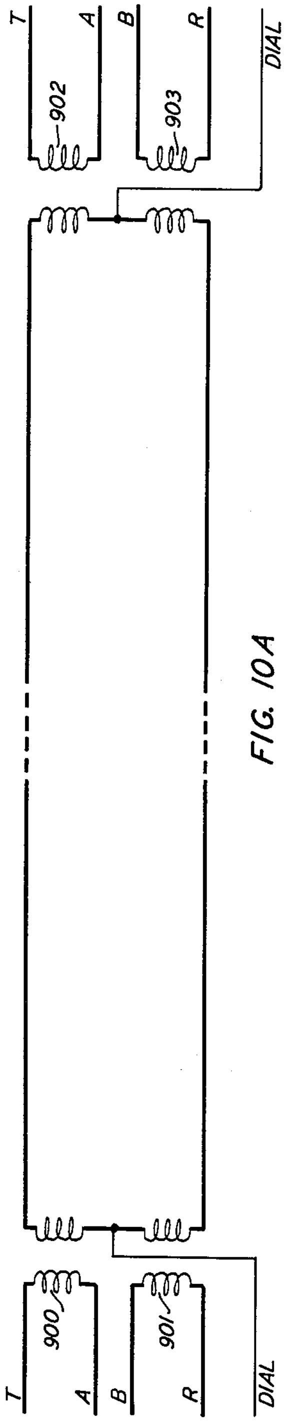
Figure 10A:
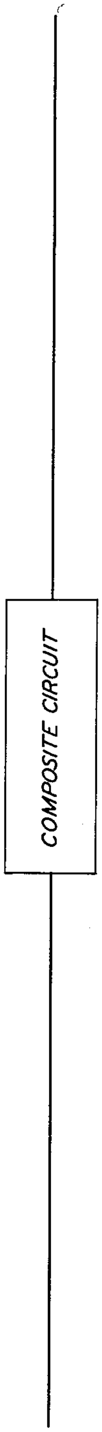
Figure 10:
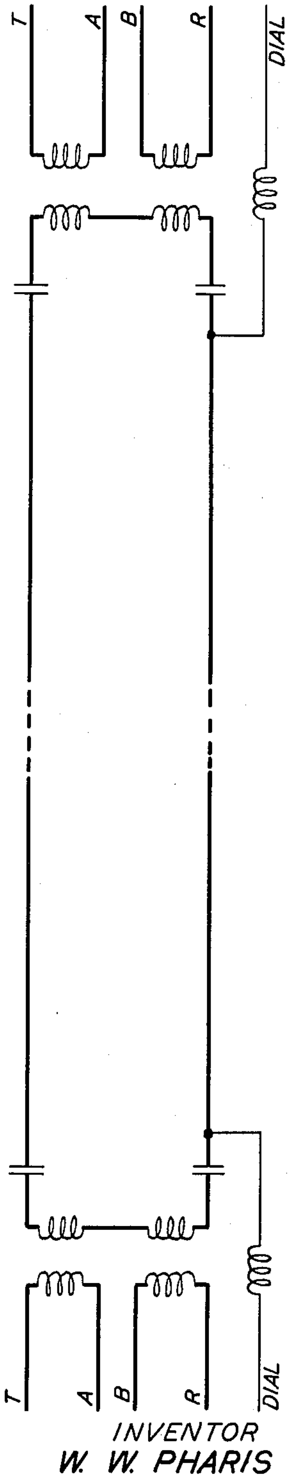
Figures 11, 11A:
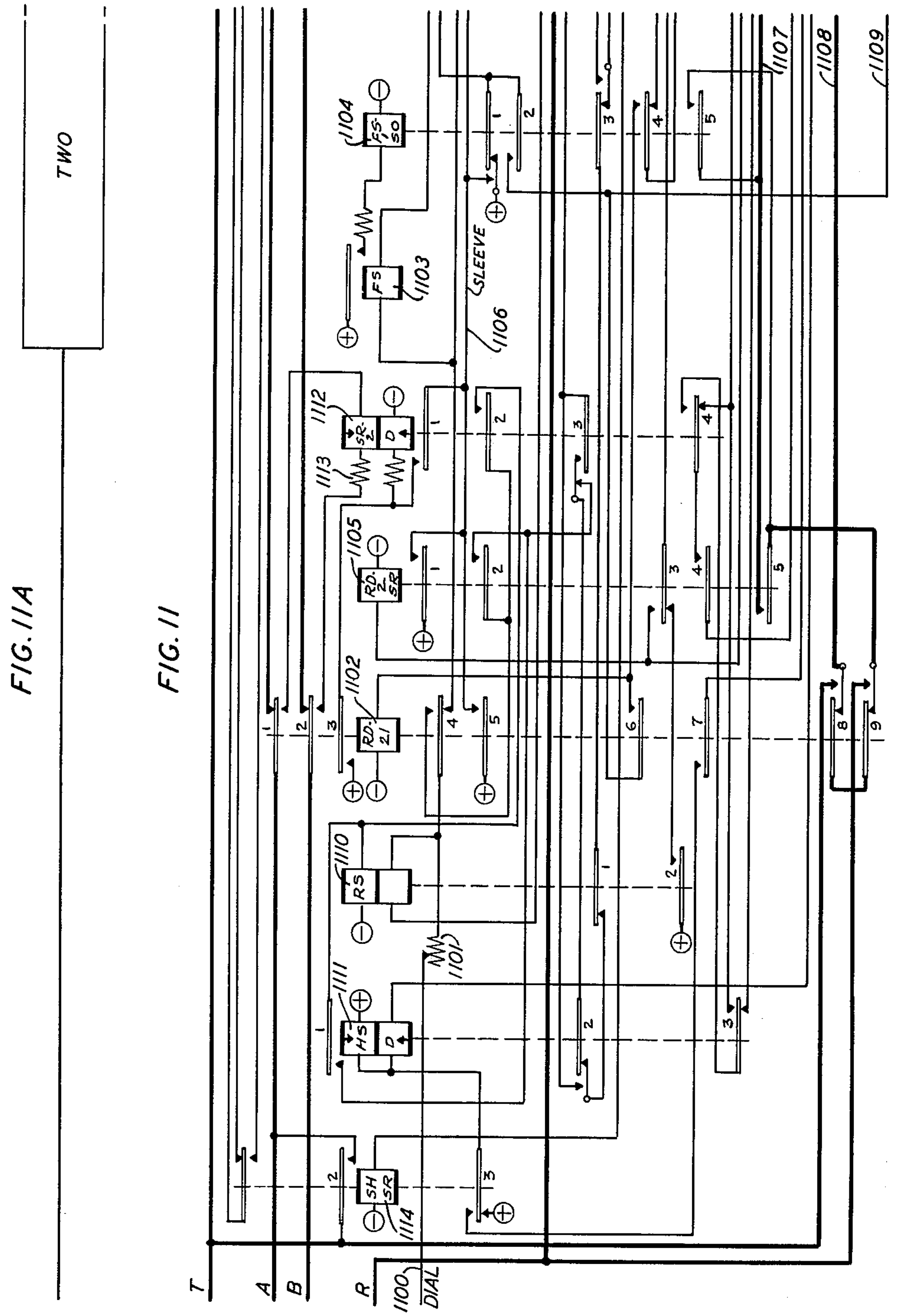
Figures 12, 12A:
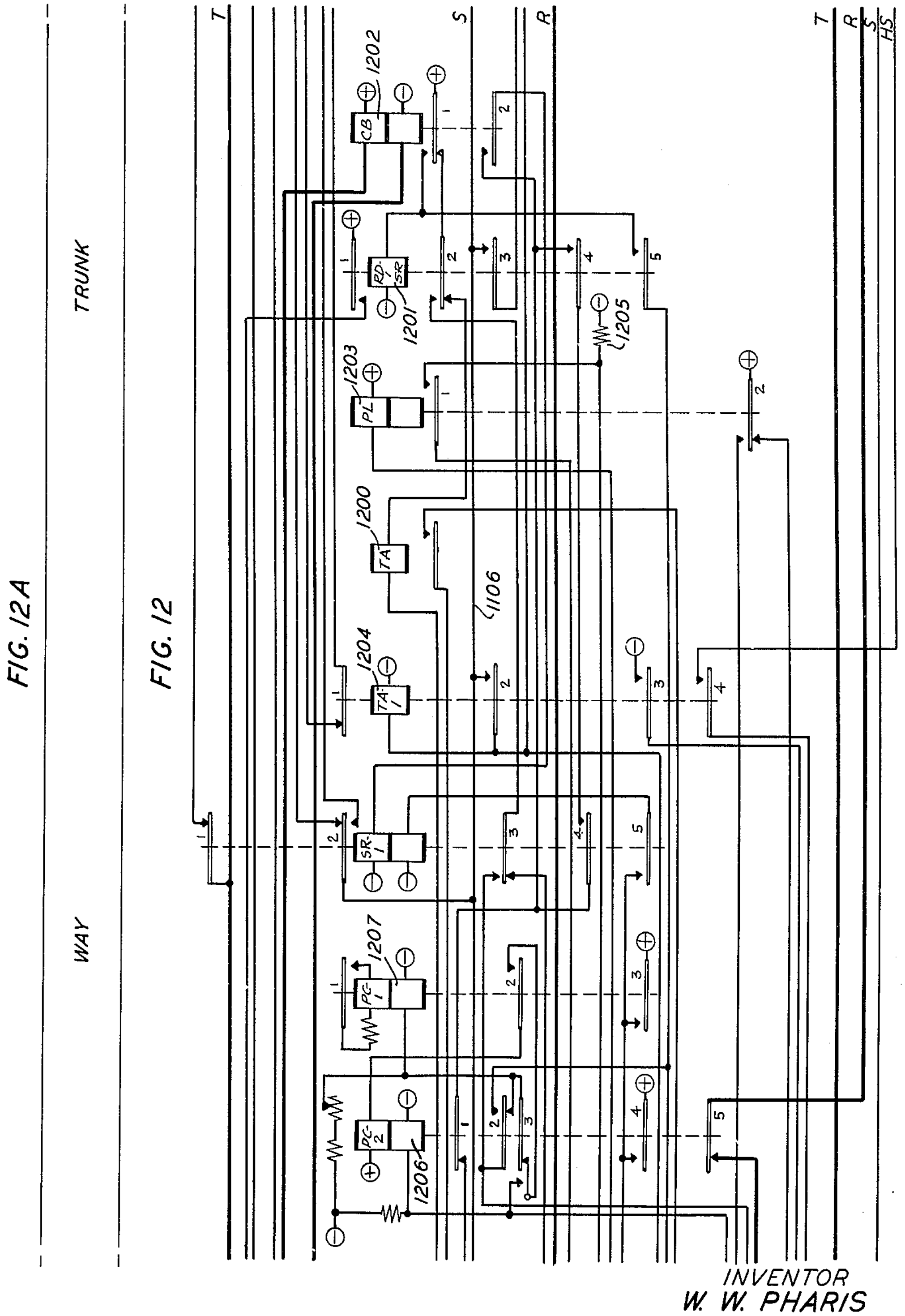
Figures 13, 13A:
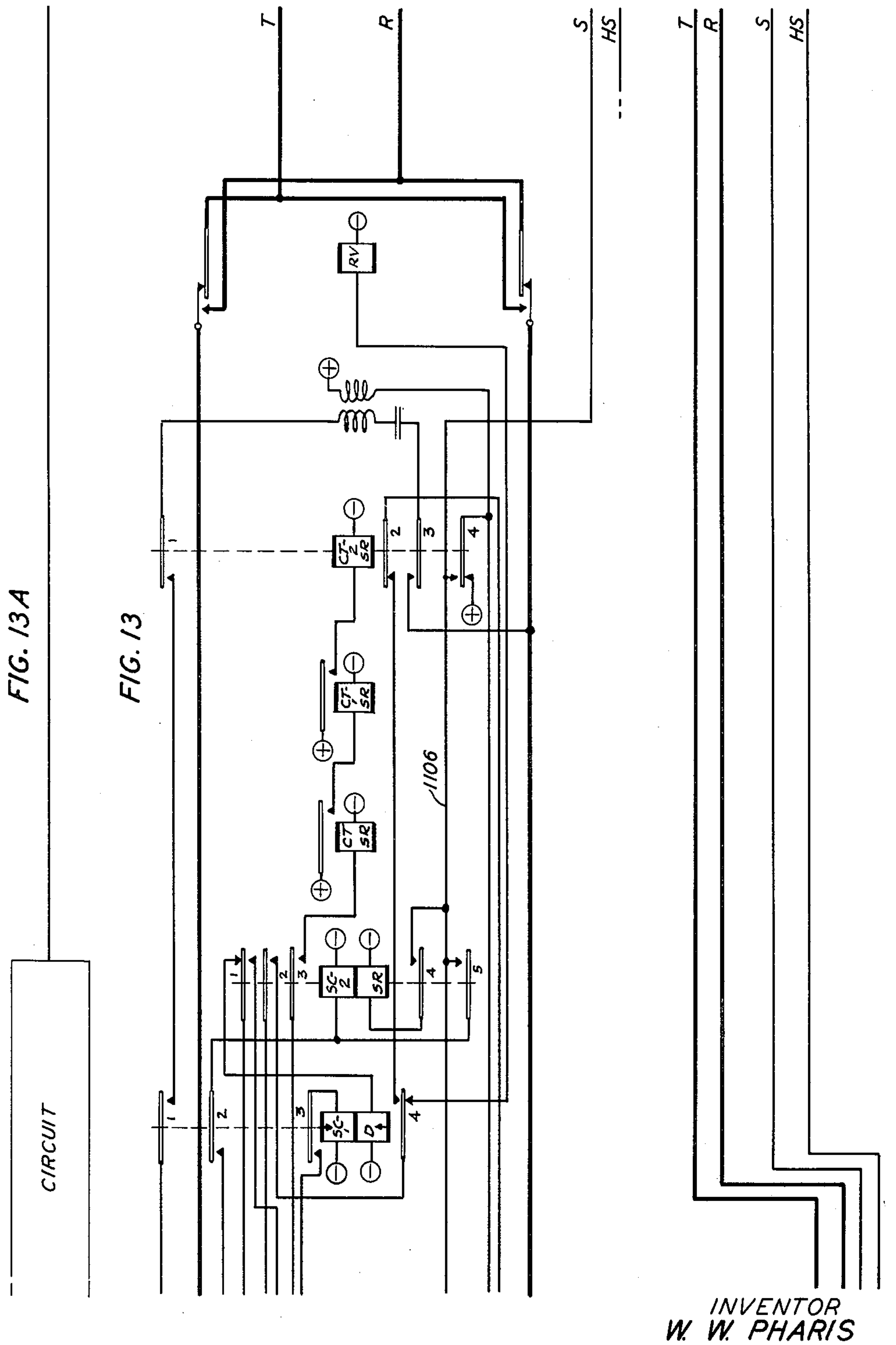
Figures 14, 14A:
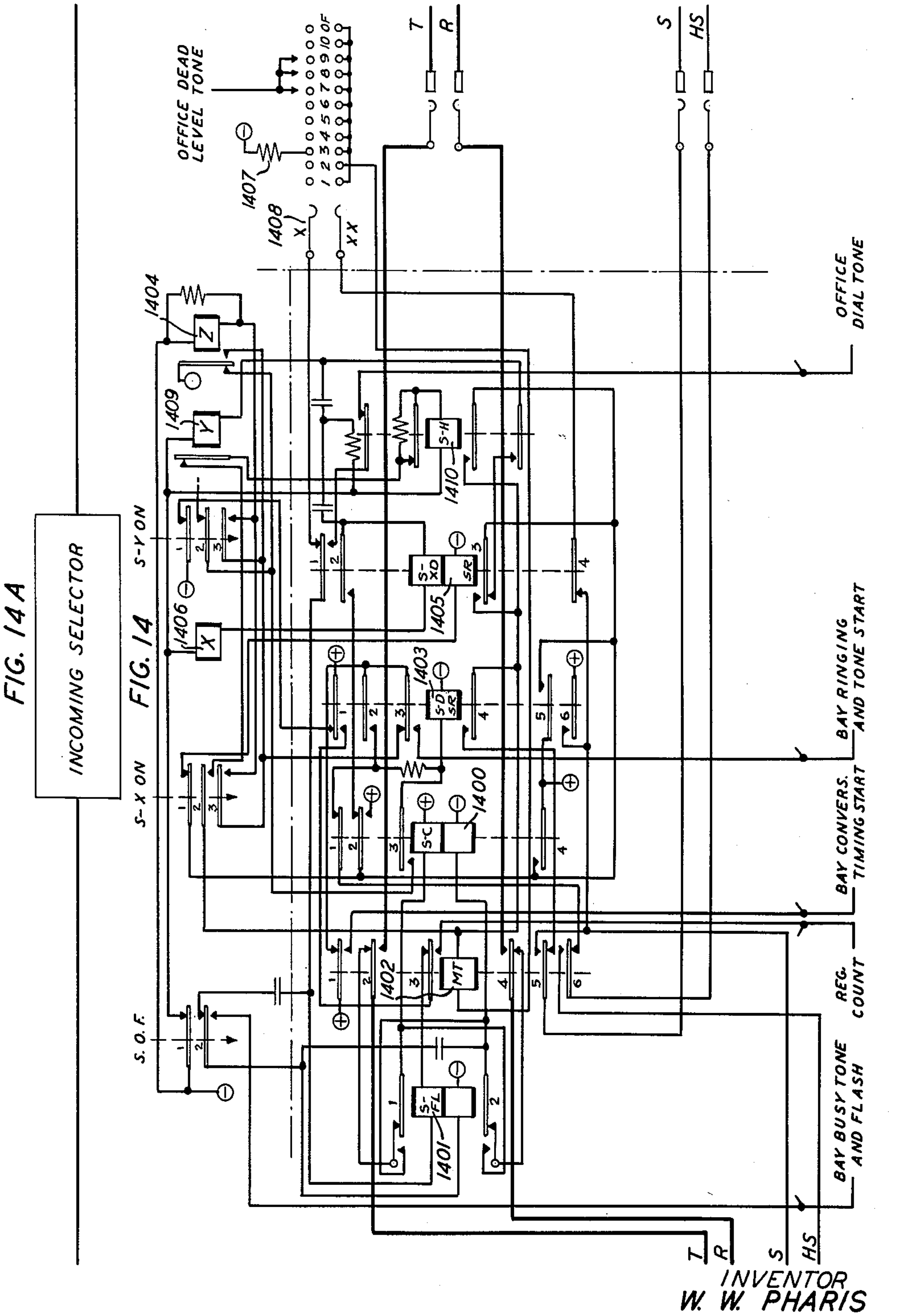
Figure 15A:
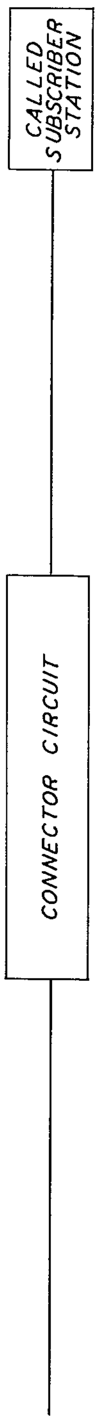
Figure 15:
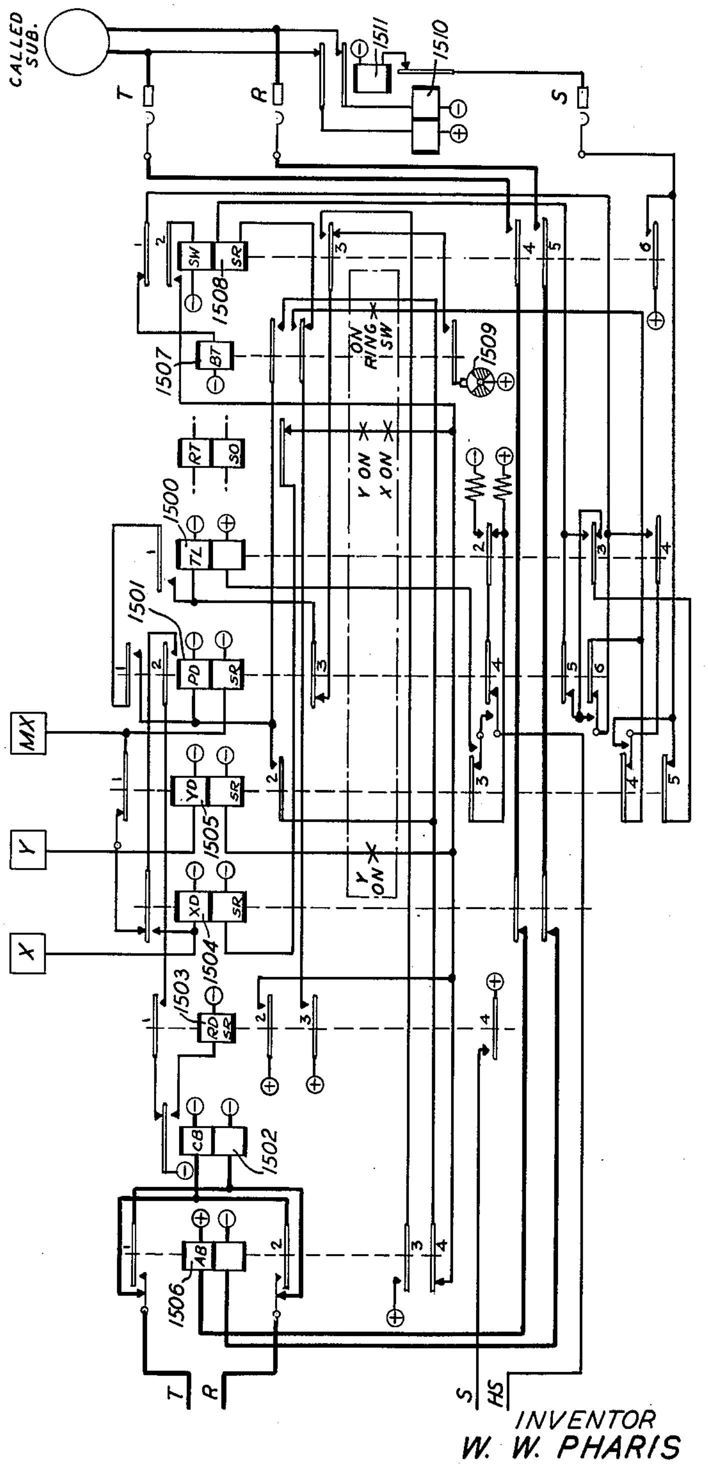
Figures 16, 16A:
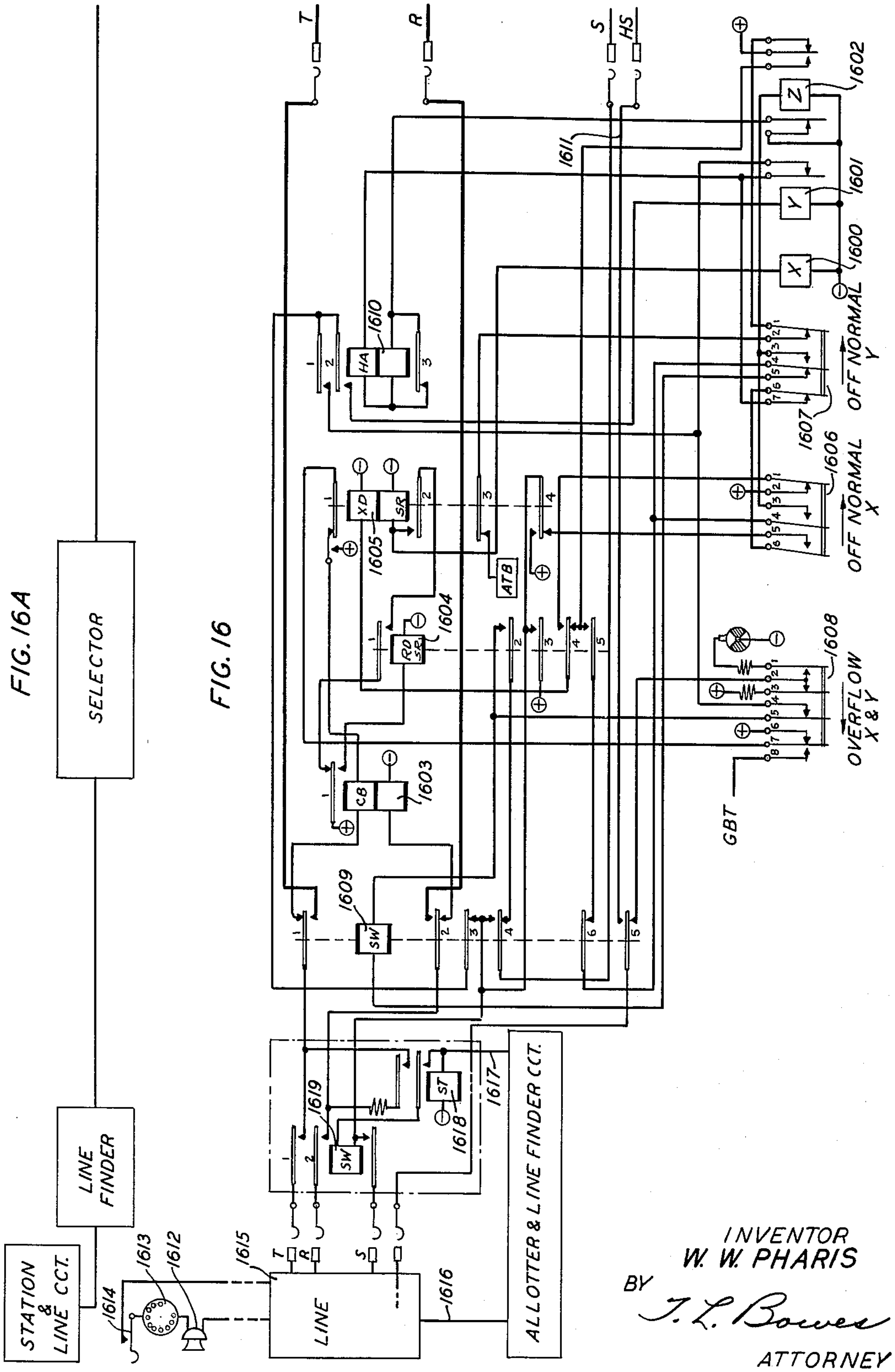

Fig. 4 shows the arrangement of the same figures used in the arrangement of Fig. 3 except that the direction of traffic has been reversed, that is, a connection has now been established from the local subscriber station (Fig. 16) thence over the two way trunk and the derived long line circuit to the distant end of the two way trunk in the direction opposite to that indicated in Figs. 1, 2, and 3 to the incoming selector and called subscriber station in Figs. 14 and 15, the arrangement of the manner in which these figures are to be placed including the use of directional arrows;

Fig. 5 is a skeletonized schematic drawing showing a toll board cord circuit and an out dial trunk which may be operated from this cord circuit and which leads to Fig. 6;

Fig. 5A is a bracketing label for the circuits described in the above Fig. 5;

Fig. 6 is a schematic circuit diagram showing a toll selector operable from the out dial trunk of Fig. 5;

Fig. 6A is a bracketing label for the circuits in the above described Fig. 6;

Figs. 7 and 8 constitute a schematic circuit diagram for one terminal circuit arrangement of a two way trunk which over one set of terminals may be seized by the toll selector of Fig. 6 or a local selector of Fig. 16 and over another set of terminals may lead to an incoming switch, as in Fig. 14, and over a third set of terminals lead to the communication channel extending to a distant point;

Figs. 7A and 8A together form a bracketing label for the circuits in the above described Figs. 7 and 8;

Fig. 9 is a simple schematic diagram showing a simplex circuit arrangement which may be used as a communication channel from the terminal circuit arrangement of Figs. 7 and 8 to the distant terminal circuit arrangement of Figs. 11, 12 and 13 inclusive;

Fig. 9A is a bracketing label for the above described circuit of Fig. 9;

Fig. 10 is a simple schematic diagram showing a composite circuit arrangement which may be used as a communication channel from the terminal circuit arrangement of Figs. 7 and 8 to the distant terminal circuit arrangement of Figs. 11, 12 and 13 inclusive;

Fig. 10A is a bracketing label for the circuit of the above described Fig. 10;

Figs. 11, 12 and 13 constitute a terminal circuit arrangement for the two way trunk at the end of the long line of Fig. 9 or Fig. 10 distant from the terminal circuit arrangement of Figs. 7 and 8 inclusive;

Figs. 11A, 12A and 13A constitute a bracketing label for the circuit arrangement for the above described Figs. 11, 12 and 13 inclusive;

Fig. 14 is a schematic circuit diagram of an incoming selector suitable to be worked over the two way trunk circuit;

Fig. 14A is a bracketing label for the circuit of the above described Fig. 14;

Fig. 15 is a schematic circuit diagram of a selector circuit and a called subscriber station which may be reached over the incoming switch of Fig. 14;

Fig. 15A is a bracketing label for the circuits of the above described Fig. 15;

Fig. 16 is a schematic circuit diagram of a calling substation, its line circuit, a line finder and selector in a conventional switch train by which a connection may be established to the terminals of the two way trunk in Fig. 7;

Fig. 16A is a bracketing label for the circuits of the above described Fig. 16;

Fig. 17 is a skeleton schematic diagram showing normal connections of a circuit embodied in the features of the present invention;

Fig. 18 is a skeleton schematic circuit diagram showing the changes which have taken place in the circuit of Fig. 17 upon the seizure of the two way trunk line of Fig. 7 over a toll selector, such as that of Fig. 6;

Fig. 19 is a skeleton schematic circuit diagram which shows further changes which have immediately taken place following the establishment of the circuit of Fig. 18;

Fig. 20 is a skeleton schematic circuit diagram showing the further changes which have taken place in this fundamental circuit after the distant switch train, including the distant incoming switch, has been operated to establish a connection to a called subscriber station and this called subscriber has responded;

Fig. 21 is a skeleton schematic circuit diagram showing a further change which has taken place in the fundamental circuit at the end of the conversation and where the switch train has started to release at the far end thereof;

Fig. 22 is a skeleton schematic circuit diagram showing a further change as the process of releasing at the far end of the line becomes effective to signal the near end of the line;

Fig. 23 is a skeleton schematic circuit diagram showing the first change in the fundamental circuit similar to that illustrated in Fig. 18, but this time responsive to the seizure of the trunk line over a local selector train;

Fig. 24 is a skeleton schematic circuit diagram showing changes immediately made in the fundamental circuit when the automatic operation has proceeded to the stage in which the trunk is ready for dialing, and Fig. 25 is a skeleton schematic circuit diagram showing the changes produced in this fundamental circuit when the called party answers.

*Connection from a toll board to a distant called subscriber station in the direction indicated in Fig. 1*

The layout of Fig. 1, generally indicated in Figs. 5A to 15A inclusive, is for the establishment of a connection from a toll board in a main dial office to a called substation in a community dial office. Since the two offices are in many cases a considerable distance apart, a connection must be established over a long line, sometimes referred to as a toll line or even a long distance line. Selecting means in the form of an incoming selector is provided at the incoming end of this long line.

In some cases the incoming end of the long line terminates in the banks of a line finder whereby the long line may be extended over a line finder selector link, a selecting arrangement which is not immediately ready to receive dial pulses. In such case a signal known as a stop dial signal must be returned to the user of the dial to notify her that the distant apparatus to which the connection is being extended, is not yet ready for use. When this apparatus is ready, then the stop dial signal must be changed to a start dial signal.

The selector at the end of the out dial trunk is one which may select different kinds of lines, some terminating in local lines leading to selectors and some terminating in long lines or lines otherwise terminating in the banks of line finders. The various types of lines are grouped so that on some "levels" of the selector the local lines may be selected while on other levels the long lines may be selected. A level over which the link type connections are reached is known as a stop dial level since the selection of the level is instrumental in returning a signal to the operator to display the stop dial indication. This is maintained until the line finder has found the calling trunk and has attached a selector thereto, and which selector is made ready to receive the dial pulses. Thereupon a signal is sent from this distant point to the operator to change the display to the start dial indication.

The circuits are in general reduced to skeleton form, only the signaling connections being shown. The talking connections are shown only insofar as they are employed in the signaling functions. Thus, in Fig. 5, the cord circuit used in the toll board is indicated by the back plug 500 used by the operator in answering a call and the front plug 501 used in establishing a desired connection. The dial 502, the start and stop dial signal 503 and a number of relays are shown and the circuit operates as follows. The nature of the desired connection having been ascertained by the operator by a connection established over the back cord and plug 500, the front plug is inserted in a jack 504 of an out dial trunk, the talk key 505 is operated to connect the common operator's apparatus to this particular cord and the dial key 506 is operated to associate the operator's dial with the front cord (a similar key is provided to associate the dial with the back cord). A connection is now established from battery (indicated by a minus sign within a circle) the top springs of the dial key 506, the front contact and armature 1 of relay 507, the tip of plug 501, the tip of jack 504, the winding of the RC relay 508 to ground (indicated by a plus sign within a circle), thus causing the RC relay to operate. The relay 507 is operated in an obvious circuit over the lower springs of the dial key 506.

Another connection is made from ground, the dial 502, front contact and armature 3 of relay 507, the ring of the plug and the jack, the armature and front contact of the RC relay 508, the winding of the PL relay 509 to battery and since the dial presents a closed circuit at this time the PL relay operates. This closes a dialing circuit between the tip and ring conductors leading to the toll selector so that this selector is thereby effectively seized and in the manner to be shortly described will return a ground over the sleeve conductor to operate the SL-1 relay 510.

When the talk key 505 is operated, relay 512 is operated in an obvious circuit and this establishes a connection from battery, the winding of relay 513, armature 1 and front contact of relay 512, the sleeve of plug 501, the sleeve of jack 504 to the windings of the SL relay 511. The top winding of this sleeve relay is of high resistance to a permanent ground connection and will not operate the relay 513. The bottom winding of the sleeve relay 511 is of low resistance, through the front contact and armature of the SL-1 relay 510 and the back contact and armature of the SR relay 514 to ground and when this circuit is closed relay 513 will respond.

Immediately the plug 501 is inserted in the jack 504, the sleeve is closed through the high resistance winding of the SL relay 511 but the low resistance winding thereof is open at the SL-1 relay 510 so that relay 513 does not operate and hence the start stop lamp 503 remains dark to display the stop dial signal. However, as soon as the selector of Fig. 6 is ready for operation, ground on the sleeve operates the SL-1 relay 510 and this closes through the low resistance winding of the SL relay 511 to operate the relay 513. Thereupon a connection is established from ground front contact and armature of relay 513, armature 2 and front contact of relay 512, armature 2 and front contact of relay 507 through the start and stop dial lamp 503 to battery. Thus the start and stop dial lamp is operated to display the start dial indication.

It will be noted that thereafter the start and stop dial lamp depends on the operation of the SR relay 514. When no connection or a ground connection is made to the HS lead the SR relay remains unoperated and the start and stop lamp is lighted to display the start dial indication. On the other hand, when battery is applied to the HS lead the SR relay 514 is operated, the low resistance winding of the SL relay is opened and the start and stop dial lamp goes dark to display the stop dial indication, or, as otherwise expressed, moves to the stop dial position.

The toll selector shown in Fig. 6 is a modification of a conventional step by step selector having an X or group selecting movement under control of incoming dial pulses and an automatic Y or individual trunk selecting movement, the X and Y designations representing the co-ordinate movement of the selector brushes or wipers. In general, such a selector is provided with a set of overflow springs operated when the wipers are moved more than ten steps in either direction, a set of X off normal springs operated on the first movement of the wipers in the X direction, a set of Y off normal springs likewise operated on the first movement of the wipers in the Y direction, and three main operating magnets, here represented by small rectangles carrying the designations X, Y and Z. The X magnet moves the wipers in the X direction, the Y magnet moves the wipers in the Y direction and the Z magnet releases the wipers to be returned to normal. There are four wipers, designated T, R, S and HS which may be moved in both the X and Y directions and another pair designated X and XX which move only in the Y direction during X motion and a like number of steps to the principal wipers T, R, S and HS.

There is a principal line relay which responds to the seizure of the selector and the dial pulses transmitted thereto and a first and second slow relay which maintain established conditions during dialing and trunk hunting and lastly a cut through relay which establishes a clear metallic path through the selector when an idle trunk has been found and seized.

The X wiper works over a bank of terminals any one or more of which may be grounded to mark the corresponding level as a stop dial lever. If the X brush stops on a grounded terminal the SD relay will be operated and will transfer the HS lead from the outgoing trunk shown in Fig. 5 from ground to battery whereby the start and stop dial signal is operated to its stop dial indication. If the X brush stops on a non-grounded terminal the SD relay is not operated and consequently the start dial signal indication is maintained.

Since the toll selector of Fig. 6 is in the toll office, the stop dial signal is operated from a near or local point and will be maintained in this position until a signal is received from a distant point indicating that a selector at such distant point has been associated with the extended connection and is ready to receive dial pulses.

The operation of the toll selector in some more detail is as follows. When the PL relay 509 in the out dial trunk is operated, the tip and ring conductors leading to the selector are short-circuited and the CB relay 600 is operated through the back contacts of the SW relay 601. The CB relay 600 causes the operation of the first slow release RD relay 602 in an obvious circuit and the second slow release XD relay 603 in a circuit from ground, armature 1 and front contact of the CB relay 600, springs 2 and 1 of the X off normal contacts 604, upper winding of the XD relay 603 to battery. The RD relay 602 and the XD relay 603 both ground the sleeve conductor to operate the SL–1 relay 510.

When the dial 502 is operated it transmits a train of pulses each consisting of a short period open circuit. The PL relay 509 and in turn the CB relay 600 follow these pulses. Each pulse is therefore translated into a closure of a circuit from ground, armature 1 and back contact of the CB relay 600, armature 4 and front contact of the RD relay 602, armature 1 and front contact of the XD relay 603 and thence in one direction through the lower winding of the XD relay 603 to battery and in another direction through armature 2 and front contact of the RD relay 602, the X magnet 605 to battery. Thus, the X magnet is operated once for each dial pulse and will cause the wipers of the selector to be moved to a corresponding level. Upon the first movement of the selector in the X direction the X off normal contacts are operated and consequently the original circuit for the XD relay 603 is opened but this relay is maintained in operation by the dial pulses and will therefore hold until a short interval after the termination of this train of pulses.

When the XD relay 603 releases, a circuit is established from ground, armature 5 and front contact of the RD relay 602, armature 2 and back contact of the XD relay 603, springs 5 and 6 of the X off normal contacts, springs 6 and 7 of the Y off normal contacts 606, winding of the HA relay 607, and thence in parallel through resistance 609 and the back contact and armature 3 of the HA relay 607, the contacts of the Y magnet 610 to battery. The HA relay 607 operates in this circuit and holds through the resistance 609. Upon the operation of the HA relay 607 a circuit is established for the Y magnet 610 from battery through the winding of the Y magnet, front contact and armature 2 of the HA relay 607, armature 3 and back contact of the SW relay 601 to the sleeve conductor now grounded at the front contact and armature 5 of the RD relay 602. The energization of the Y magnet moves the wipers one step in the Y direction and into contact with the terminals of the first trunk in the selected level. At the same time the Y magnet opens the circuit of the HA relay 607 and this on operation opens the circuit of the Y magnet. The Y magnet on release again closes the circuit of the HA relay so that the interaction of the Y magnet and the HA relay results in the automatic stepping of the wipers of the selector so long as busy trunks are encountered and ground is found on the sleeves thereof.

Upon the first step of the switch in the Y direction the Y off normal contacts 606 are operated so that the original ground for the operation of the HA relay 607 is opened at springs 7 and 6 of the Y off normal contacts. However, a ground is extended from the sleeve of a busy trunk over armature 9 and back contact of the SW relay 601, armature 6 and front contact of the RD relay 602, the springs 5 and 4 of the overflow contacts 611, the springs 1 and 2 of the X magnet to the winding of the HA relay 607, whereby the automatic operation of the Y magnet may be enabled as above described.

The SW relay is the means for detecting an idle trunk and for stopping the further operation of the Y magnet. The connection at the right side of the winding of the SW relay is grounded both before and after the operation of this relay by ground on the sleeve lead to the out dial trunk of Fig. 5. Before the operation of the SW relay a circuit may be traced through the springs 5 and 6 of the Y off normal contacts 606, the springs 6 and 5 of the X off normal contacts 604, back contact and armature 2 of the XD relay 603, front contact and armature 5 of the RD relay 602 to ground. Immediately after the operation of the SW relay and before the RD relay can release, a circuit may be traced over the front contact and armature 4 of the SW relay 601, sleeve of the out dial trunk, front contact and armature 5 of the RD relay 602 to ground. After the SW relay has been operated the continued operation thereof depends on a ground returned from the circuit beyond, found on the sleeve lead and traced over the sleeve wiper, armature 9 and front contact of the SW relay 601 to the sleeve of the out dial trunk of Fig. 5 and in parallel therewith through armature 4 and front contact of the SW relay 601 to the winding thereof which will then be energized in series with the then unoperated HA relay 607.

The other terminal of the winding of the SW relay 601, prior to the finding of an idle trunk, extends over two circuits in parallel, the first extending through the winding of the HA relay 607 as described and the other being closed to ground found on the sleeves of the busy trunks. This ground maintains a short circuit on the winding of the SW relay so that it cannot operate. However, when an idle trunk is found this latter ground will be missing and hence the SW relay will operate in series with the HA relay 607 but the latter relay being marginal will not operate in this circuit due to the comparatively high resistance of the SW relay. After the operation of the SW relay the sleeve wiper of the selector is switched through the armature 9 and front contact of the SW relay to the sleeve of the preceding trunk and the continued operation of the SW relay will depend on the return of a ground from the extended circuit.

Now, it has been pointed out hereinbefore that if the X movement of the selector brings the X brush thereof to a grounded terminal, the SD relay 612 will respond. The circuit for this operation may be traced from battery, the contacts of the Y magnet 610, the upper winding of the SD relay 612, armature 3 and back contact of the XD relay 603 (shortly after the completion of the X movement of the selector) armature 5 and back contact of the SW relay 601, front contact and armature 2 of the CB relay 600 the X wiper to the said grounded terminal. The SD relay locks through its front contact and armature 3 to ground supplied by armature 3 and front contact of the RD relay 602. The operation of the SD relay 612 switches its armature 2 from ground to battery. After the operation of the SD relay its armature 2 may be traced over springs 3 and 2 of the overflow contacts 611, front contact and armature 5 of the SD relay 612, to the HS lead to the out dial trunk so that the SR relay 514 is operated to display the stop dial signal.

If the X wiper of the selector had not found a grounded terminal, then the SD relay would not have been operated hence the ground on the back contact of armature 2 of the SD relay 612 would have been extended over springs 3 and 2 of the overflow contacts 611, back contact and armature 8 of the SW relay 601, back contact and armature 5 of the SD relay 612 to the HS lead whereby the SR relay 514 would remain unoperated and the start dial signal would be displayed.

Upon the operation of the SW relay 601 the CB relay 600 is released and in time the RD relay 602 releases. If the SD relay has been operated it is held as described by the RD relay until this relay releases. Thereafter it is held in a circuit from its lower winding, its front contact and armature 4, the armature 8 and front contact of the SW relay 601 to the HS wiper of the selector and thence to the ground connection found normally on the HS lead. When a stop dial signal is received from the distant community dial office the start-stop dial signaling is transferred to control of circuits ahead over the HS lead so that the ground connection is changed to a battery connection and consequently the SD relay is released. The HS lead is thereupon cut through this selector circuit so that the SR relay 514 and consequently the start-stop dial signaling will be under control of the circuit beyond leading to the circuit at the far end of the long line.

Release of the selector upon the release of the SW relay 601 when the ground is removed from the sleeve is conventional.

Let it be assumed that the long line circuit beginning with Fig. 7 is approached by the toll selector of Fig. 6 over a stop dial level, even though the two way trunk circuit at the distant end terminates in an incoming selector. In this case the SD relay 612 is operated so that as the circuit of Fig. 7 is seized and the SW relay 601 is operated to cut through, the HS lead 608 shows a battery connection to the seized circuit, which may be traced from the HS wiper back over the lead 608, front contact and armature 8 of the SW relay 601, armature 4 and front contact of the SD relay 612, lower winding thereof to battery. It may be noted that this circuit will be extended to the lower winding of the TA relay 700 to ground and this will result in the operation of the TA relay and the momentary holding of the SD relay 612. However, the TA relay immediately operates and locks through its upper winding, its armature 1 and front contact to the sleeve lead 701 and thus transfers the HS lead from the ground connection through the lower winding of the TA relay to a battery connection over the armature 3 and front contact of the TA relay 700, the armature 3 and back contact of the SR–1 relay 702, a resistor 703 to battery, so that the holding of the SD relay is of extremely short duration. Thereafter the SD relay releases and the circuit is cut through, as hereinbefore described, leaving the grounded SR relay 514 connected to armature 3 of the SR–1 relay 702 so that as this relay operates or releases the start and stop dial signal 503 will be operated. In the present case, before SR–1 relay 702 is operated the armature 3 thereof will extend a battery connection from the resistor 703 to the SR relay 514 to exhibit the stop dial signal.

It should be noted at this point that prior to the seizure of the trunk line beginning in Fig. 7, the circuit shown in skeleton in Fig. 17 is normally established. This may be traced from ground, the armature 1 and back contact of the CB relay 704, the armature 4 and back contact of the SR–1 relay 702, the armature 4 and back contact of the SC relay 705, the PL relay 800, the armature 6 and back contact of the RD–21 relay 801, the normal contacts of armature 4 of the SR–2 relay 802, the adjustable resistor 803 employed to adjust this fundamental circuit, thence over the dial leg 804 of the interoffice trunk which, in Fig. 9 is a simplex circuit and in Fig. 10 is a composite circuit, thence over the dial leg 1100 of the distant two way circuit terminal, the adjustable resistor 1101, the armature 4 and back contact of the RD–21 relay 1102, the winding of the FS relay 1103, the winding of the TA relay 1200, the back contact and armature 2 of the RD–1 relay 1201, the back contact and armature 1 of the CB relay 1202 to ground. In the simplified circuit, Fig. 17, it will be noted that this circuit is grounded at both ends and is therefore ineffective to operate any one of the relays therein. However, upon the operation of the TA relay 700 this circuit is changed to that shown in Fig. 18. Shortly the CB calling bridge relay 704 and the RD–1 first slow relay 705 will be operated so that a circuit may be traced now from battery, the upper winding of the SR–1 relay 702, the front contacts of armature 4 of the TA relay 700, the armature 4 and back contact of the PC–2 relay 805, the armature 2 and front contact of the CB relay 704, through the armature 6 and back contact of the RD–21 relay 801 and thence over the dial circuit hereinbefore described to the distant FS and TA relays to ground. It will be noted that the upper winding of the SR–1 relay is directly connected in this circuit and that the high resistance element 706 is not involved at the present time. The SR–1 relay 702 is marginal and does not operate in this circuit, but it does provide a circuit of low enough resistance to cause the operation of the distant FS and TA relays, as indicated by the position of the armatures thereof in Fig. 18.

In more detail, when the circuit of Fig. 7 is seized by the selector of Fig. 6 a dialing circuit is established from ground, the upper winding of the CB relay 704, the back contact and armature 2 of the RD–21 relay 801, upper winding 900 of the simplex circuit repeating coil, the tip conductor, the back contact and armature 1 of the RV relay 707, thence over the tip conductor of the toll selector (Fig. 6), the front contact and armature 6 of the SW relay 601, the tip conductor of the out dial trunk (Fig. 5), the front contact and armature of the PL relay 509, the ring conductor of the out dial trunk, the armature 7 and front contact of the SW relay 601, the ring conductor of the toll selector (Fig. 6), the armature 2 and back contact of the RV relay 707, the ring conductor of the two way trunk circuit, the winding 901 of the simplex circuit repeating coil, armature 3 and back contact of the RD–21 relay 801, the lower winding of the CB calling bridge relay 704 to battery. The CB relay through its armature 1 and front contact immediately operates the RD–1 first slow releasing relay 705 and these two relays thereupon partially establish the dialing circuit. This circuit will be completed shortly thereafter when the distant FS and TA relays have operated and have established at the distant end the connection to the PL relay 1203 thereat, as indicated in Fig. 19. The resistance of the PL relay in this circuit is low enough to cause the operation of the SR–1 relay 702 so that the SR–1 relay responds and through its armature 3 and front contact causes the SR relay 514 to release to operate the start dial signal at the toll board.

Upon the establishment of the fundamental circuit, as shown in Fig. 18 where the FS relay 1103 and the TA relay 1200 are in circuit with the comparatively low resistance relay 702, then both these distant relays will become operated. The FS relay 1103 through its armature and front contact will establish a circuit for the FS–1 slow operating relay 1104. At the same time, the TA relay 1200 in series with the FS relay 1103 operates and closes a circuit from ground, the back contact and armature 1 of the FS–1 relay 1104, the armature and front contact of the TA relay 1200, the armature 4 and back contact of the FS–1 relay 1104, through the winding of the TA–1 relay 1204. The closure of this circuit by the TA relay 1200 is facilitated by the slow operating characteristic of the FS–1 relay 1104. The TA–1 relay 1204 locks to ground which is immediately placed on the sleeve lead 1106 through its front contact and armature 2. It should be noted that the sleeve lead 1106 is grounded by the contacts of armature 1 of the FS–1 relay 1104, a make-before-break arrangement whereby the locking circuit of the TA–1 relay 1204 will be closed before its original circuit is opened.

Upon the operation of the FS–1 relay a circuit is closed from ground through the winding of the PL relay 1203, the contacts of armature 3 of the FS–1 relay 1104, through a resistance 1205 to battery so that the PL relay 1203 becomes operated. Through its armature 2 the PL relay 1203 closes a circuit directly through the winding of the RD–2 relay 1105. This relay additionally through its armature 1 and front contact grounds the sleeve 1106.

Upon the operation of the FS–1 relay 1104 a circuit is established from the ring conductor 1107 of the incoming selector associated with this two way trunk through the armature 5 and front contact of the FS–1 relay 1104, the back contact and armature 9 and armature 8 and the back contact of the RD–21 relay 1102 to the tip conductor 1108 leading to the incoming selector, whereby this selector shown in Fig. 14 is seized and in the usual manner will immediately place a ground on the sleeve conductor 1109. Upon the operation of the RD–2 relay 1105 this bridge circuit, first closed by the armature 5 and front contact of the FS–1 relay 1104, is additionally closed by the armature 5 and front contact of the RD–2 relay 1105. It may be noted that this additional closure will be maintained after the FS–1 relay 1104 is released.

Responsive to the appearance of ground on the sleeve of the incoming switch conductor 1109, this ground is now extended through the front contact and armature 2 of the FS–1 relay 1104, thence the front contact and armature of the TA relay 1200, armature 4 and front contact of the FS–1 relay 1104 through the winding of the RD–21 relay 1102. This causes the operation of the RD–21 relay which, through its front contact and armature 6, locks to the ground on the sleeve 1109 of the incoming switch. Through the operation of the RD–21 relay the fundamental circuit connected through armature 4 of the RD–21 relay is opened so that the FS relay 1103 and the TA relay 1200 are thereupon released. The FS–1 relay 1104 having no locking circuit releases, but the TA–1 relay 1204 having locked itself to the ground on the sleeve conductor 1106 remains operated. The release of the FS–1 relay 1104 now transfers the PL relay from an operating circuit through the resistance 1205 to a connection through the back contact and armature 3 of the FS–1 relay 1104, the armature 1 and back contact of the RS relay 1110, the back contact and armature 2 of the HS relay 1111, the contacts of armature 3 of the SR–2 relay 1112, front contact and armature 2 of the RD–2 relay 1105, front contact and armature 4 of the RD–21 relay 1102, the adjustable resistance 1101 and thence back over the fundamental circuit thus establishing the condition shown in Fig. 19, where the PL relay 1203 has been substituted at the distant end of this fundamental circuit for the two relays FS, 1103 and TA, 1200. The resistance of the PL relay 1203 is lower than the combined resistances of the PS and TA relays and the SR–1 relay 702 will respond in this circuit so that the SR relay 514 of the out dial trunk is now released with the result that the start dial signal is displayed.

Before proceeding with the further description of the operations of the two way trunk, it should be shortly noted that when this trunk has been approached over a local selector such as that shown in Fig. 16, the HS lead 1611 will be opened so that the TA relay 700 will fail to operate in this instance. In the XY step by step dial system where four wipers are used, designated T, R, S and HS the fourth, or HS, lead is used for various purposes. Usually this HS lead is connected through a front contact and armature of the switch through relay, such as the SW relay 1609, to a line extending into the line circuit where it may be variously connected for special purposes. In the present instance it will be understood that this HS lead is left unconnected in the line circuit and therefore when the selector of Fig. 16 makes connection to the two way trunk, the TA relay 700 will not operate. Under this condition the circuit shown in Fig. 23 will be established whereby the SR–1 relay 702 will be in a circuit including the resistance 706 so that the FS relay 1103 will operate but the TA relay 1200 will fail to operate. The results of such a connection will be explained in more detail hereinafter.

The condition of Fig. 19 has now been established and the trunk circuit is ready for dialing. The PL relay 1203 will respond to the dial pulses from the toll operator's cord circuit and on each such pulse will establish a circuit from ground, its armature 2 and back contact through the armature 4 and front contact of the RD–2 relay 1105, the armature 4 and back contact of the SR–2 relay 1112 through the lower winding of the PC–2 relay 1206. It should be noted that the PC–2 relay 1206 and the PC–1 relay 1207 control what is known as a pulse correction circuit whereby the pulses which may have become distorted in time in their transmission over the long line will be corrected. The corrected pulses will then be forwarded by the operation of armature 5 and its back contact of the PC–2 relay 1206, thus opening the bridge circuit which has been instrumental in seizing the incoming selector of Fig. 14.

It may also be shortly noted at this point that upon the operation of the RD–21 relay 1102, the bridge circuit used for the seizure of the incoming selector is changed somewhat and may now be traced from the tip conductor 1108, the contacts of armature 8 of the RD–21 relay 1102 over the tip conductor through the upper right hand repeating coil winding 902, armature 1 and front contact of the RD–21 relay 1102, the upper low resistance winding of the SR–2 relay 1112, the resistor 1113 by means of which this bridge circuit may be adjusted in practice, the front contact and armature 2 of the RD–21 relay 1102, the lower right hand repeating coil winding 903, the ring conductor through the contacts of armature 9 of the RD–21 relay 1102, armature 5 and front contact of the RD–2 relay 1105, the back contact and armature 5 of the PC–2 relay 1206 to the ring conductor extended to the incoming switch of Fig. 14. It is to be noted that under the condition found in this incoming switch where the tip is connected to ground and the ring is connected to battery, the direction of current flow through the upper winding of the SR–2 relay 1112 is opposed to the direction of current flow in the circuit from ground, front contact and armature 3 of the RD–21 relay 1102, the lower winding of the SR–2 relay 1112 to battery and this relay being constructed and arranged as a differential relay will not operate under the present circuit conditions. Again, it may be noted shortly that the incoming selector Fig. 14 contains a reversing arrangement whereby the current flow in the upper winding of the SR–2 relay 1112 may be reversed. Under this reversed condition, as when the called party answers, the SR–2 relay 1112 will become operated. This will appear in more detail hereinafter.

The incoming selector of Fig. 14 is a conventional selector modified to provide a stop dial level service. When the selector is first seized, circuits may be traced from ground, the upper winding of the SC relay 1400, armature 1 and back contact of the S–FL relay 1401, back contact and armature 2 of the MT relay 1402 to the tip conductor, and from battery, the lower winding of the SC relay 1400, armature 2 and back contact of the S–FL relay 1401, back contact and armature 4 of the MT relay 1402 to the ring conductor. It may be noted that the operation at some later stage of the S–FL relay 1401 will reverse the tip and ring conductors for the purpose of transmitting a stop dial signal back to the toll board.

The SC relay 1400 is the usual line relay and this causes the operation of the first slow releasing SD relay 1403, in a circuit from ground, armature and back contact of the Z release magnet 1404, front contact and armature 3 of the SC relay 1400, the winding of the SD relay 1403 to battery. The second slow releasing SXD relay 1405 is operated from ground, the front contact and armature 2 of the SC relay 1400, spring 1 and back contact of the X off normal group and the lower winding of the SXD relay 1405.

When dial pulses are received the SC relay 1400 will respond and by a circuit from ground, armature 5 and front contact of the SD relay 1403, armature 2 and back contact of the SC relay 1400, front contact and armature 2 of the SXD relay 1405, the upper winding thereof and thence in series through the winding of the X stepping magnet 1406 will maintain the SXD relay energized after the movement of the X off normal springs, while stepping the selector to the desired level. At the end of this X movement the SXD relay 1405 releases.

Now, if the level reached is a stop dial level, a connection will be made from battery, a resistance 1407, the X wiper 1408, the back contact and armature 1 of the SXD relay 1405, the upper winding of the SFL relay 1401, back contact and armature 3 of the MT relay 1402, front contact and armature 1 of the SD relay 1403 to ground whereby the SFL relay is operated to reverse the tip and ring conductors to the trunk circuit of Figs. 11–13 inclusive to transmit the stop dial signal to the toll board. If a level other than a stop dial level is reached the SFL relay 1401 is not operated. It may be noted that if the selector is moved to overflow position, then the lower winding of the SFL relay 1401 is connected to a common flashing lead whereby the SFL relay is repeatedly operated to transmit a flashing signal back to the toll operator.

Whether the level reached is a stop dial level or not, the Y stepping magnet 1409 will now be automatically operated through the interaction of this magnet and the SH relay 1410, until the sleeve wiper encounters an idle outgoing line marked by the absence of ground on the sleeve terminal thereof. The MT relay 1402 is then operated to switch through a clear path whereby the polarity of the tip and ring is now responsive to the circuits beyond this selector. It will be noted that if the trunk selected is in a stop dial level, it will present battery on the tip and ground on the ring so as to maintain the stop dial indication until a link type connection is completed.

Let it be assumed that the selection made by the incoming selector (Fig. 14) is a connector circuit shown in the following Fig. 15. This connector is conventional in most respects and consequently the circuit has been skeletonized to make the operations in respect to the present invention more clear. When the connector is seized a circuit is established from ground, back contact and armature 2 of the TL relay 1500, armature 4 and back contact of the PD relay 1501 to the HS lead so that as soon as the selector of Fig. 14 is cut through this ground connection will be extended back toward the toll board to display the start dial signal in a manner which will be more fully explained hereinafter. The CB relay 1502 is operated over the tip and ring and four slow releasing relays immediately operate, the RD relay 1503 which holds during the use of the conductor, the XD relay 1504 which is associated with the X magnet and releases after the end of the first train of dial pulses, the YD relay 1505 which is associated with the Y magnet and releases after the end of the second train of dial pulses and the PD relay 1501, which is associated with the MX magnet of the minor ringing current selector, and which releases at the end of the third train of dial pulses. For the sake of simplicity the off normal contacts are each shown as an X drawn across a conductor and it will be understood that each is normally closed until the first movement in the indicated direction is taken.

After the connector has been seized and during the transmission of the first train of pulses thereto, a connection is extended from battery, front contact and armature 3 of the TA–1 relay 1204, the armature 7 and front contact of the RD–21 relay 1102, the front contact and armature 3 of the SH relay 1114, operated by the pulse correction relays through the lower winding of the HS relay 1111, the HS conductor through the incoming selector circuit, the HS conductor in this connector circuit, over the front contacts and armature 4 of the PD relay 1501, the front contacts and armature 3 of the YD relay 1505, the lower winding of the TL relay 1500 to cause this relay to operate. The TL relay locks through its upper winding, its front contact and armature 1, the armature 1 and front contact of the PD relay 1501, the front contact and armature 2 of the YD relay 1505, the armature 4 and back contact of the AB relay 1506 to the main ground lead supplied from the armature 2 and front contact of the RD relay 1503. The TL relay 1500 remains operated until the end of the second train of pulses. At this time the BT relay 1507 is connected to the sleeve of the called line at the end of the second digit and before the YD relay 1505 can release over the front contacts of the armature 4 of the YD relay 1505, armature 4 and front contact of the TL relay 1500, the armature 1 and back contact of the SW relay 1508 to the winding of the BT relay 1507 to battery. Therefore, if the called line is busy, the BT relay operates and locks through its own front contact and armature 2 to a ground supplied by armature 3 of the RD relay 1503.

At this point it may be noted that after the operator has dialed the last digit she would probably return her dial key to normal and watch for the answer of the called subscriber or the busy condition of the called line by her regular supervisory signal. However, should she fail to return the dial key to normal, the start and stop lamp will act as a supervisory signal. If the called line is busy the BT relay 1507 will operate and so at the end of the third train of pulses and when the PD relay 1501 releases a circuit is established from ground, an interrupter 1509, armature 3 and front contact of the BT relay 1507, back contact and armature 3 of the SW relay 1508, back contact and armature 3 of the PD relay 1501 to the upper winding of the TL relay 1500, whereby the TL relay will follow the interrupter and alternately connect battery and ground to the HS lead at its armature 2. This will cause the alternate operation and release of the SH relay 1114 and the alternate application of battery through the front contact and armature 1 thereof to the fundamental circuit so that start and stop dial at the operator's position will effectively follow this interrupter 1509. This will notify the operator that she has encountered a busy line.

If the called line is idle, then a circuit is established, after the third train of dial pulses, from ground, armature 3 and front contact of this RD relay 1503, armature 2 and back contact of the BT relay 1507, lower winding of the SW relay 1508, armature 5 and back contact of the PD relay 1501, back contact and armature 3 of the TL relay (now released), armature 5 and back contact of the YD relay 1505, the sleeve wiper of the connector, the armature and back contact of the LR relay 1510, the winding of the CO relay 1511 to battery. The SW relay 1508 and the CO relay 1511 operate together. The SW relay 1508 places a firm ground on the sleeve at its armature 6 and locks through its upper winding and armature 2 to the main ground of the connector.

Until the called party answers the TL relay 1500 remains released and therefore returns ground over its back contact and armature 2 to light the supervisory lamp of the called circuit (or the start and stop dial lamp). When the called subscriber answers, the AB relay 1506 responds and reverses the current in the tip and ring toward the selector for purposes at least one of which will appear hereinafter. The AB relay 1506 by reversing the tip and ring connections causes the operation of the SR–2 relay 1112, as previously described, and this relay in turn will cause a battery connection to be made to the fundamental circuit in order to release the SR–1 relay 702 at the originating end, as indicated in Fig. 20. This displays the stop dial signal at the toll operator's position. The AB relay 1506 also places ground on the front contact of armature 3 of the SW relay 1508 to operate the TL relay 1500. This changes the HS lead from ground to battery for the purpose of operating the HS relay 1111, as hereinbefore described.

Other connections in the connector circuit, such as the talking circuit from the incoming terminals to the wipers are not shown, but will be readily understood by those skilled in the art.

It is to be especially noted that when the two way trunk is seized at Fig. 7 over a toll switch train and that consequently the TA–1 relay 1204 is operated, the HS relay 1111 is included in an effective circuit. This relay is a differential relay and will respond to a battery connection over the HS lead from the connector circuit as long as the SH relay 1114 remains in its released condition as shown. The HS relay 1111, in operating, cuts off the PL relay 1203 from the fundamental dialing circuit and substitutes the upper winding of the RS relay 1110, thus transmitting a battery connection back over the dialing leg to operate the stop dial signal. However, when dialing is taking place the PC relays are operated and this results in the operation of the SH relay 1114, whereupon the HS relay 1111 is rendered incapable of responding to a battery connection from the connector circuit. Hence, such a battery connection cannot interfere with dialing during the process of dialing. Under these conditions the start and stop dial signal will report the encounter of a stop dial level, a busy condition of the called line as well as the answer of the called party.

On the other hand, if the originating connection came from a local subscriber station, as in Fig. 16, then the TA–1 relay 1204 would not have been operated and hence signals over the HS lead from the connector would not affect the HS relay 1111. Therefore, the busy condition of the called line would not be reported back but only the answer of the called subscriber through the conventional reversal of the line resulting in the operation of the SR–2 relay 1112. It has been pointed out hereinbefore that the operation of this relay also reverses the condition of the fundamental dialing circuit by substituting the battery connected RS relay for the ground connected PL relay. These conditions are depicted in the three skeleton Figures 23, 24 and 25.

When the conversation has been completed the release of the connection starts in the connector circuit through the release of the CB relay 1502 and the AB relay 1506. As shown in Fig. 15, the release is under the control of the RD relay 1503 which is the first slow relay responding to the calling bridge relay 1502. Therefore, when the calling subscriber releases the connection, the ground placed on the sleeve by the armature 4 of the RD relay 1503 is released and this removes ground from the sleeve conductor 1109 thus allowing the RD–21 relay 1102 and in turn the RD–2 relay 1105 to release. The RD–21 relay 1102 in releasing transfers the fundamental circuit by its armature 4 back into connection with the FS and TA relays, whereby the SR–1 relay 702 is allowed to return to its normal unoperated condition. The CB relay 704 at that point, has in the meantime released, thus releasing the RD–1 slow relay 705 and this in turn removes the ground from the sleeve conductor 701. Through the release of the RD–1 relay 705 its armature 2 removes ground from the armature 3 of the SC relay 708, so that this relay releases. Thus, the connection is restored to normal.

*Arrangement of Fig. 3*

The circuit of Fig. 16 is conventional. A subscriber station is indicated by a transmitter 1612, a dial 1613 and a hook switch 1614. This subscriber station is connected to a conventional line circuit 1615 which, by means of a starting wire 1616, which enters an allotter and line finder circuit arrangement from which a starter wire 1617 is operated to cause the operation of the ST relay 1618. The ST relay causes the brushes of the finder switch to hunt for the calling line and when the connection has been made with this, the SW relay 1619 is operated. The selector forming the main part of the drawing is conventional. It has an X magnet 1600 for moving its wipers in the X direction, a Y magnet 1601 for moving its wipers in the Y direction and a Z magnet 1602 for releasing the wipers. It has a calling battery CB relay 1603 which will operate and respond to dial pulses and a first slow release RD relay 1604 and a second slow release XD relay 1605. There is a set of X off normal springs 1606, a set of Y off normal springs 1607 and a set of X and Y overflow springs 1608.

When the selector is seized as hereinbefore stated and the cut off relay of the line circuit has operated current flows from the positive grounded battery, springs 6 and 7 of the overflow set 1608, armature 1 and back contact of the XD relay 1605, upper winding of the CB relay 1603, back contact and armature 1 of the SW relay 1609, the tip conductor through the circuit of the line finder and the line circuit to the substation, back over the ring conductor, armature 2 and back contact of the SW relay 1609, lower winding of the CB relay 1603 to negative battery.

The CB relay 1603 responds and causes the operation of the first slow RD relay 1604 in an obvious circuit. Through its armature 3 and front contact the RD relay 1604 returns the ground on the sleeve conductor to signal the proper seizure of the selector and to operate the cut through relay in the line finder, as described. A circuit is now established from ground, springs 2 and 1 of the X off normal set 1606, front contact and armature 4 of the RD relay 1604, upper winding of the XD relay 1605 so that both the slow relays are thus operated.

It is to be noted that the HS lead in this instance is indicated as being unconnected in the line circuit and although it is extended through the armature 5 and back contact of the SW relay 1609, this connection has no function. The subscriber now dials. The CB relay 1603 responds by releasing at each break in the circuit caused by the dial 1613. Upon the first such release a circuit is established from ground, armature 1 and back contact of the CB relay 1603, armature 1 and front contact of the RD relay 1604, armature 2 and front contact and lower winding of the XD relay 1605, which circuit becomes effective as soon as the first step in the X direction has been taken and operates to hold the XD relay until this first train of pulses has terminated. This ground, through armature 2 of the XD relay 1605, is also extended through the X magnet 1600 to step the wipers of this selector in the X direction. Thus, the selector is moved in the X direction to select a given level so that shortly after the last pulse of the train the XD relay 1600, whose upper winding has been released by the movement of the X off normal springs 1606, will now be released by the steady energization of the CB relay 1603.

The Y magnet 1601 will now be automatically operated to move the wipers of the selector into connection with an idle outgoing line in the selected level. Upon the release of the XD relay 1605 a circuit is established from negative battery, the contacts controlled by the Z magnet 1602, the armature 3 and back contact and the upper winding of the HA relay 1610, contacts 7 and 6 of the X off normal set 1607, contacts 6 and 5 of the X off normal set 1606, back contact and armature 4 of the XD relay 1605, front contact and armature 3 of the RD slow release relay 1604 to ground. The HA relay 1610 operates and closes a circuit for the Y magnet 1601 from battery, the winding of the Y magnet, front contact and armature 2 of the HA relay 1610, the armature 3 and back contact of the SW relay 1609, to the grounded sleeve from the line finder and after the first step in the Y direction also through armature 1 and front contact of the HA relay 1610, springs 4 and 5 of the overflow set 1608, front contact and armature 2 of the RD relay 1604, back contact and armature 4 of the SW relay 1609 to the grounded sleeve of the busy outgoing lines. Upon the operation of the Y magnet 1601, the Y off normal set 1607 operates to open the circuit of the HA relay 1610 so that this relay releases to, in turn, release the Y magnet 1601.

Upon this first step in the Y direction the SW relay 1609 is set up in a circuit to detect the first idle trunk and thereupon to stop the automatic action. This circuit may be traced from ground, armature 3 and front contact of the RD relay 1604, armature 4 and back contact of the XD relay 1605, springs 5 and 6 of the X off normal set 1606, springs 6 and 5 of the Y off normal set 1607 to one terminal of the SW relay 1609, and from the other terminal thereof to a divided circuit, one branch of which extends through the front contact and armature 2 of the RD relay 1604, the back contact and armature 4 of the SW relay 1609 to the sleeve wiper of the selector where it encounters ground on each busy trunk and the other branch of which may be traced through springs 5 and 4 of the overflow set 1608, the springs controlled by the Y magnet 1601, after this magnet has become deenergized, the upper winding of the HA relay 1610, the back contact and armature 3 thereof, the springs controlled by the Z magnet 1602 to battery. As long as busy outgoing lines are encountered the HA relay 1610 will operate as soon as the Y magnet becomes deenergized and will start another stepping movement, at the same time holding the SW relay 1609 short circuited, but as soon as an idle trunk is reached then the SW relay 1609 and the HA relay 1610 are effectively placed in series. The resistances of these two relays (SW is comparatively higher than HA) is such that the SW relay 1609 operates and the HA relay 1610 remains unoperated. Thereupon the tip, ring and sleeve will cut through to the circuit selected, in this case a two way trunk circuit leading to a distant office, and the CB relay 1603 and, shortly thereafter, the RD relay 1604 releases. Sleeve ground to hold the SW and HA relays operated is thereafter derived from the two way trunk circuit of Fig. 7 so that the connection established will be maintained until released by the removal of this ground in this trunk circuit.

The one point to be noted here is that as the SW relay 1609 cuts through, the HS lead 1611 forwards no connection to the circuit of Fig. 7 and hence the TA relay 700 therein does not operate. Since the TA relay at the near end of the trunk line does not operate, the TA relay 1200 at the far end will not operate with the results that have hereinbefore been noted.

In each case upon the operation of the CB relay 704 and the RD–1 relay 705, a circuit will be extended from ground, armature 2 and front contact of the RD–1 relay 705, the armature 2 and back contact of the SC relay 708, the winding of the SC–1 relay 700 to battery. The SC–1 relay 709 will operate and extend the ground connection over its front contact and armature 1 to the winding of the SC relay 708 so that this relay in turn operates and locks through its front contact and armature 3 at the same time releasing the SC–1 relay 709. When the SC relay 708 is operated then the resistance 706 is placed in series with the SR–1 relay 702 so that the condition depicted in Fig. 23 is established. With this high resistance in the fundamental circuit only, the FS relay 1103 at the distant end will be operated and the TA relay 1200 thereat will remain unoperated.

It is believed that the difference between the connection established by a toll line seizure of the trunk and the local line seizure of the trunk will be abundantly apparent from the skeleton schematic drawings of Figs. 17 to 25 inclusive.

It has been noted hereinbefore, that when the two way trunk line of Fig. 7 has been seized from a local connection, that the TA relay 700 is not operated and that a stop dial signal and the busy called line signal is not returned, but only the signal for the answer of the called subscriber. It may be noted that when the SR–1 relay 702 is operated, the SR–11 relay operates and locks through its front contact and armature 2. Thereafter, when the called subscriber answers and the SR–2 relay 1112 operates to connect the RS relay 1110 to the fundamental circuit, the SR–1 relay 702 releases. Thereupon ground from the sleeve 701, is connected over armature 1 and back contact of the SR–1 relay 702, back contact and armature 2 of the TA relay 700, front contact and armature 1 of the SR–11 relay, the winding of the RV relay 707 to battery. The RV relay reverses the connections back toward the calling line for the usual purposes.

*Reverse direction traffic.—Fig. 4*

Fig. 4 shows that a connection over the two way trunk line may be established in the opposite direction. Thus the selector of Fig. 16, now assumed to be in the distant office, may be operated to select the outgoing terminals of the trunk line in Fig. 13. These centered terminals in Fig. 13 match the four terminals of Fig. 16. Thus, the selector may seize the trunk line and establish a connection in the opposite direction finally emerging over the incoming terminals of Fig. 7 which match the similarly placed terminals in the lower left hand corner of Fig. 14.

*In general*

On outgoing calls, in Figs. 7 and 8, the CB calling bridge relay 704 and the RD–1 first slow relay 705 supply battery to the calling subscriber and repeat pulses into the fundamental circuit over the dial leg of the simplex or the composite circuit. The PL relay 800 and its slow releasing relays, including the RD–21 relay 801 are cut off by the operation of the SC relay 708. At the distant end the PL relay 1203 and its slow releasing relays, the RD–2 relay 1105 and the RD–21 relay 1102, are operated and the CB relay 1202 and its slow releasing RD–1 relay 1201 are cut off by the operation of the RD–21 relay 1102.

When a connection in the other direction, as indicated in Fig. 4 is established, these general conditions are reversed. The CB relay 1202 supplies battery to the calling subscriber and the DL relay 1203 is cut off, the pulses from the calling subscriber's dial being transmitted into the fundamental dial leg circuit by the CB relay 1202 and the RD–1 relay 1201 to operate the distant PL relay 800. At that end the PL relay 800 and its slow releasing RD–2 relay have control of the circuit and the CB relay 704 is cut off by the RD–21 relay 801.

In general the means for discriminating between toll and local connections is not provided for traffic in the direction of Fig. 4, but is must be understood that these same facilities could be provided if necessary.

*By way of example*

The resistance of the dial leg between the two terminal circuit arrangements is adjusted by the resistances 803 and 1101. Each of these may have a range of 0 to 1000 ohms. If it is assumed that the trunk loop resistance is 500 ohms then each of these resistors will be set at 150 ohms making a total of 800 ohms for composite operation (Fig. 10) or set at 250 ohms making a total of 950 ohms for simplex operation (Fig. 9).

The resistance of the various relays may be as follows:

| | Ohms |
|---|---|
| SR–1, **702** | 332 |
| Resistance, **706** | 5000 |
| FS, **1103** | 2120 |
| TA, **1200** | 514 |
| PL, **1203** | 214 |

Therefore the resistance of the path shown in Fig. 23, by which relay FS above becomes operated is 8766 for CX and 8916 for SX operation.

The resistance of the path shown in Fig. 18, by which both relay FS and TA become operated is 3766 for CX and 3916 for SX operation.

The resistance of the path shown in Fig. 19, by which relay SR–1 becomes operated is 1346 for CX and 1490 for SX.

This means that where a potential of 48 volts is employed that the relay FS will operate on as little as 5½ milliamps, that the TA relay will operate on as little as 12 milliamps and that it takes in the range of 31 milliamps to operate the SR–1 relay.

It will be understood that these values are by way of example only and may be changed over wide ranges.

What is claimed is:

1. In a telecommunication system, a two way trunk circuit consisting of two terminal circuit arrangements at each end of and including a long line having a communication channel and a derived signaling path, an incoming selector connected to and associated with each said terminal arrangement for extending connections therefrom, selector switch terminals connected to each said terminal arrangement whereby connections may be extended thereto, and a signal path between said terminal arrangements including said derived signaling path, means in a near end terminal circuit arrangement responsive to a disconnect signal transmitted over a path established by a selector connected through said selector switch terminals individual to said near end terminal circuit arrangement for transmitting said disconnect signal over said derived signal path to said far end terminal arrangement and thence over the said incoming selector circuit associated therewith to cause the release of said incoming selector, means in said far end terminal circuit arrangement for simultaneously transmitting back to said near end terminal circuit arrangement a holding signal to prevent the release of said selector connected to said near end terminal circuit arrangement and means responsive to the release of said far end incoming selector for discontinuing the transmission of said holding signal.

2. In a telecommunication system, a two way trunk circuit consisting of two terminal circuit arrangements at each end of and including a long line having a communication channel and a derived signaling path, an incoming selector connected to and associated with each said terminal arrangement for extending connections therefrom, selector switch terminals connected to each said terminal arrangement whereby connections may be extended thereto, and a signal path between said terminal arrangements including said derived signaling path, means in a near end terminal circuit arrangement responsive to a disconnect signal transmitted over a path established by a selector connected through said selector switch terminals individual to said near end terminal circuit arrangement for establishing a circuit in said signal path including a pulsing relay (PL) in said near end terminal arrangement and a release relay (RS) in said signal path at said far end terminal arrangement, both said relays operating in said established circuit, means responsive to said near end relay (PL) for holding said selector against release, means responsive to said far end relay (RS) for releasing the said incoming selector individual to said far end terminal circuit arrangement, and means responsive to the release of said far end incoming switch for opening said established circuit to release said (PL) and (RS) relays.

3. In a telecommunication system, a two way trunk circuit consisting of two terminal circuit arrangements at each end of and including a long line having a communication channel and a derived signaling path, an incoming selector connected to and associated with each said terminal arrangement for extending connections therefrom, selector switch terminals connected to each said terminal arrangement whereby connections may be extended thereto, and a signal path between said terminal arrangements including said derived signaling path, means in a near end terminal circuit arrangement including a calling bridge (CB) relay responsive to control exercised thereover from connections extended to said near end terminal circuit over said terminals and a pulsing relay (PL) for controlling said associated incoming switch, both said relays being in said signal path and both controlling slow releasing relays having contacts for maintaining a guarding potential on said selector switch contacts, means in a far end terminal circuit including a release relay (RS) for opening a bridge on the communication channel of said incoming switch and a holding relay (RD–21) responsive to a guarding potential transmitted back from said incoming switch, a circuit arrangement responsive to the release of said calling bridge relay (CB) for establishing a circuit including said pulsing relay (PL), said release relay (RS) and said derived signal path, and means responsive to the release of said holding relay (RD–21) for opening said established circuit.

4. In a telecommunication system, a two way trunk circuit consisting of two terminal circuit arrangements at each end of and including a long line having a communication channel and a derived signaling path, an incoming selector connected to and associated with each said terminal arrangement for extending connections therefrom, selector switch terminals connected to each said terminal arrangement whereby connections may be extended thereto, and a signal path between said terminal arrangements including said derived signaling path, a bridge circuit at the near end of a connection established over said selector switch terminals and a distant bridge circuit in a circuit established through said incoming selector and controlled over said derived signaling path, means including said derived signal path responsive to the opening of a bridge circuit at the near end of an established connection for opening a bridge circuit extending into circuits reached over said incoming selector individual to a said far end terminal circuit arrangement, means including said derived signal path for maintaining a guard on said selectors at the near end and means responsive to the release of a guard on said incoming selector at said far end for opening said guard at said near end.

5. In a telecommunication system, a two way trunk circuit consisting of two terminal circuit arrangements at each end of and including a long line having a communication channel and a derived signaling path, an incoming selector connected to and associated with each said terminal arrangement for extending connections therefrom, selector switch terminals connected to each said terminal arrangement whereby connections may be extended thereto, and a signal path between said terminal arrangements including said derived signaling path, a toll operator's position, a start dial signal thereat, toll selectors operated therefrom to seize a near end said terminal circuit arrangement, means including said derived signal path for transmitting dial pulses to operate said incoming switch individual to said far end terminal circuit arrangement and to operate a switch train reached by said incoming selector and means including said derived signal path for transmitting signals over said extended connection for operating said start dial signal at said toll operator's position.

6. In a telecommunication system, a two way trunk circuit consisting of two terminal circuit arrangements at each end of and including a long line having a communication channel and a derived signaling path, an incoming selector connected to and associated with each said terminal arrangement for extending connections therefrom, selector switch terminals connected to each said terminal arrangement whereby connections may be extended thereto, and a signal path between said terminal arrangements including said derived signaling path, subscriber controlled switches for extending a connection to a said near end terminal circuit arrangement, subscriber controlled means including said derived signal path for operating said incoming switch individual to said far end terminal circuit arrangement to further extend said connection thereover to a distant subscriber station, a connector reached by said incoming selector included in said subscriber controlled means, a reversing relay in said near end teaminal circuit arrangement, a reversing relay in said connector under control of a called subscriber station reached by said connector, and means including said derived signal path controlled by said connector reversing relay for operating said near end terminal circuit arrangement reversing relay.

7. In a telecommunication system, a two way trunk circuit consisting of a long line having a communication channel, a derived signaling path, and a terminal circuit at each end thereof, an incoming selector connected to and associated with each said terminal circuit for extending connections therefrom, selector switch terminals connected to each said terminal circuit for the seizure of said trunk circuit to extend connections thereover to the said incoming selector at the distant end thereof, a signaling circuit including said derived signaling path extending into each said terminal circuit for differently controlling said incoming selector at the distant end thereof in accordance with different type connections extended over said selector switch terminals to said terminal circuit, said signaling circuit including a first relay (SR1) for transmitting supervisory signals during the existence of a particular one of said different type connections, a divided path including said first relay (SR1) leading in one direction directly to the front contact of a second relay (TA) and in another direction through a comparatively high resistance to a back contact of said second relay (TA) thence over said derived signaling path through a third relay (FS) and a fourth relay (TA), said second relay (TA) being differently responsive to the different type circuits extended to said terminal circuit, said third relay (FS) and said fourth relay (TA) both being responsive when said second relay (TA) is operated to its said front contact and said third relay (FS) only being responsive when said second relay (TA) is released to its said back contact and means for substituting a fifth relay (PL) for said third relay (FS) and said fourth relay (TA), said first relay being responsive only when said fifth relay (PL) is substituted for said third relay (FS) and said fourth relay (TA).

8. In a telecommunication system, a two way trunk circuit consisting of a long line having a communication channel, a derived signaling path and a terminal circuit at each end thereof, an incoming selector connected to and associated with each said terminal circuit for extending connections therefrom, selector switch terminals connected to each said terminal circuit for the seizure of said trunk circuit to extend connections thereover to the said incoming selector at the distant end thereof, a control circuit in said terminal circuit completed over one of said selector switch terminals, a signaling circuit including said derived signaling path extending into each said terminal circuit for differently controlling said incoming selector at the distant end thereof in accordance with different type connections extended over said selector switch terminals to said terminal circuit, said different type connections being differently identified over said control circuit, said signaling circuit including a first relay (SR1) for transmitting supervisory signals during the existence of a particular one of said different type connections, a divided path including said first relay (SR1) leading in one direction directly to the front contact of a second relay (TA) and in another direction through a comparatively high resistance to a back contact of said second relay (TA) thence over said derived signaling path through a third relay (FS) and a fourth relay (TA), said second relay (TA) being responsive to said control circuit, said third relay (FS) and said fourth relay (TA) both being responsive to said front contact circuit of said second relay (TA) and said third relay (FS) only being responsive to said back contact circuit of said second relay (TA), and means for substituting a fifth relay (PL) for said third relay (FS) and said fourth relay (TA), said first relay being responsive only when said fifth relay (PL) is substituted for said third relay (FS) and said fourth relay (TA).

9. In a telecommunication system, a two way trunk circuit consisting of a long line having a communication channel, a derived signaling path and a terminal circuit at each end thereof, an incoming selector connected to and associated with each said terminal circuit for extending connections therefrom, selector switch terminals connected to each said terminal circuit for the seizure of said trunk circuit to extend connections thereover to the said incoming selector at the distant end thereof, a control circuit in said terminal circuit completed over one of said selector switch terminals, a signaling circuit including said derived signaling path extending into each said terminal circuit for differently controlling said incoming selector at the distant end thereof in accordance with different type connections extended over said selector switch terminals to said terminal circuit, said different type connections being differently identified over said control circuit, said signaling circuit including a first relay (SR1) for transmitting supervisory signals during the existence of a particular one of said different type connections, a divided path including said first relay (SR1) leading in one direction directly to the front contact of a second relay (TA) and in another direction through a comparatively high resistance to a back contact of said second relay (TA) thence over said derived signaling path through a third relay (FS) and a fourth relay (TA), said second relay (TA) being responsive to said control circuit, said third relay (FS) and said fourth relay (TA) both being responsive to said first front contact circuit of said second relay (TA) and said third relay (FS) only being responsive to said back contact circuit of said second relay (TA), and means in said incoming switch for decreasing the resistance of said signaling circuit through said front contact circuit of said second relay (TA) for causing the operation of said first relay (SR1).

References Cited in the file of this patent

UNITED STATES PATENTS

| | | |
|---|---|---|
| 2,391,389 | Burgener | Dec. 25, 1945 |
| 2,550,755 | Balzer | May 1, 1951 |
| 2,621,258 | Balzer | Dec. 9, 1952 |
| 2,632,813 | Bakker | Mar. 24, 1953 |